(12) United States Patent
You et al.

(10) Patent No.: US 10,266,719 B2
(45) Date of Patent: Apr. 23, 2019

(54) POLYMER COMPOSITIONS AND COATINGS FOR FOOD AND BEVERAGE PACKAGING

(71) Applicant: The Coca-Cola Company, Atlanta, GA (US)

(72) Inventors: Xiaorong You, Smyrna, GA (US); Yu Shi, Branchburg, NJ (US); Linda Hsiao-hua Liu, Alpharetta, GA (US)

(73) Assignee: The Coca-Cola Company, Atlanta, GA (US)

( * ) Notice: Subject to any disclaimer, the term of this patent is extended or adjusted under 35 U.S.C. 154(b) by 554 days.

(21) Appl. No.: 14/891,613

(22) PCT Filed: May 12, 2014

(86) PCT No.: PCT/US2014/037692
§ 371 (c)(1),
(2) Date: Nov. 16, 2015

(87) PCT Pub. No.: WO2014/186285
PCT Pub. Date: Nov. 20, 2014

(65) Prior Publication Data
US 2016/0122581 A1 May 5, 2016

Related U.S. Application Data

(60) Provisional application No. 61/824,084, filed on May 16, 2013.

(51) Int. Cl.
| | |
|---|---|
| *C09D 163/00* | (2006.01) |
| *B65D 25/14* | (2006.01) |
| *C09D 133/14* | (2006.01) |
| *C08F 283/10* | (2006.01) |
| *C09D 151/08* | (2006.01) |
| *C09D 5/00* | (2006.01) |

(52) U.S. Cl.
CPC ........... *C09D 163/00* (2013.01); *B65D 25/14* (2013.01); *C08F 283/10* (2013.01); *C09D 5/002* (2013.01); *C09D 133/14* (2013.01); *C09D 151/08* (2013.01); *C08L 2312/00* (2013.01)

(58) Field of Classification Search
CPC .... C09D 163/00; C09D 5/002; C09D 133/14; C09D 151/08; C09D 5/106; C09D 167/00; B65D 25/14; C08F 283/10; C08L 2312/00
USPC ........... 428/35.7, 35.8, 480, 413, 411.1, 461, 428/412, 458, 500, 447, 474.4, 522, 336, 428/34.1, 36.6, 402.21, 414, 416, 418, 428/423.1, 426, 457, 195.1, 220, 327, 428/328, 339, 354, 36.91, 451, 463, 483, 428/516, 520, 523, 64.4, 688, 116, 141, 428/142, 196, 201, 211.1, 219, 317.1, 428/318.4, 32.38, 32.39, 332, 334, 34.8, 428/355 AC, 35.5, 35.9, 36.4, 3; 523/400, 100, 402, 122, 456, 200, 351, 523/410, 435, 115, 116, 124, 216, 334, 523/406, 408, 412, 414, 425, 427, 428, 523/434, 437, 439, 440, 443, 458, 461, 523/466, 523; 427/385.5, 386, 256, 384, 427/402, 327, 372.2, 407.1, 487, 236, 427/287, 288, 331, 388.2, 427.4, 430.1, 427/180, 195, 282, 2.1, 2.24, 379, 409, 427/428.01, 429, 458, 496, 508, 79, 427/126.2, 162, 177, 207.1, 208.4, 239, 427/272, 289, 299, 2.3, 302, 318, 333, 427/337, 374.4, 387, 388.1, 397, 427.6, 427/439, 485, 486, 504, 510, 511, 512, 427/533, 539; 558/156, 87, 158, 397, 558/406, 430, 443; 252/500, 183.11, 397, 252/403, 407, 182.14, 182.15, 182.28, 252/182.29, 182.31, 188.28, 189, 301.35, 252/400.2, 400.24, 405, 600
See application file for complete search history.

(56) References Cited

U.S. PATENT DOCUMENTS

| | | | |
|---|---|---|---|
| 2,633,458 A | 3/1953 | Shokal | |
| 4,141,871 A * | 2/1979 | Shimp | C08G 18/4879 428/418 |
| 4,147,679 A | 4/1979 | Scriven et al. | |
| 7,682,674 B2 | 3/2010 | Vogt et al. | |
| 7,981,515 B2 | 7/2011 | Ambrose et al. | |

(Continued)

FOREIGN PATENT DOCUMENTS

| | | |
|---|---|---|
| DE | 4237658 A1 | 5/1994 |
| JP | 2000-005019 A | 1/2000 |

(Continued)

OTHER PUBLICATIONS

PCT International Search Report and Written Opinion dated Jul. 31, 2014 for International Application No. PCT/US2014/037692.

(Continued)

*Primary Examiner* — Gerard Higgins
*Assistant Examiner* — Kevin C Ortman, Jr.
(74) *Attorney, Agent, or Firm* — Eversheds Sutherland (US) LLP

(57) ABSTRACT

The present disclosure relates to coatings and coating compositions that are substantially free of bisphenol A (BPA) and similar compounds, which help reduce or minimize flavor loss associated with foods or beverages stored in contact with the coating compositions. In one aspect, the composition can include the reaction products of an intimate mixture of cyclic ether resins and acrylate resins, which provides a unique cross-linked and interpenetrating network of polymers.

15 Claims, No Drawings

(56) References Cited

U.S. PATENT DOCUMENTS

| | | |
|---|---|---|
| 9,080,059 B2 | 7/2015 | Jin et al. |
| 9,540,484 B2 | 1/2017 | Craun et al. |
| 2005/0196629 A1 | 9/2005 | Bariatinsky et al. |
| 2005/0209371 A1* | 9/2005 | Heuts .................... C08F 283/00 523/400 |
| 2007/0036903 A1 | 2/2007 | Mayr et al. |
| 2008/0096132 A1* | 4/2008 | Araki .................... B41C 1/1016 430/286.1 |
| 2010/0178442 A1* | 7/2010 | O'Brien ................ B65D 17/00 428/35.8 |
| 2011/0130518 A1* | 6/2011 | Gorodisher ........... C07C 233/49 525/119 |
| 2012/0301645 A1* | 11/2012 | Moussa .............. C08G 59/1422 428/35.7 |
| 2015/0225602 A1 | 8/2015 | Bassman et al. |

FOREIGN PATENT DOCUMENTS

| | | |
|---|---|---|
| JP | 2001-011366 A | 1/2001 |
| JP | 2005-126635 A | 5/2005 |
| WO | 2006/045017 A1 | 4/2006 |
| WO | 2013/047378 A1 | 4/2013 |

OTHER PUBLICATIONS

Office Action issued in Japanese Application No. 2016-514009, dated Jan. 25, 2018 (11 pages).

* cited by examiner

POLYMER COMPOSITIONS AND COATINGS FOR FOOD AND BEVERAGE PACKAGING

CROSS-REFERENCE TO RELATED APPLICATIONS

This application is a U.S. national stage application of international application number PCT/US2014/037692, filed May 12, 2014, which claims the benefit of U.S. Provisional Application No. 61/824,084, filed May 16, 2013, the disclosures of which are incorporated herein by reference in their entireties.

TECHNICAL FIELD

The present disclosure relates to compositions and coatings that are substantially free of bisphenol A (BPA) and related compounds.

BACKGROUND

Many beverage and food container coatings employ bisphenolic-based polycarbonates or epoxies and related polyurethanes, where the bisphenolic compounds are bound as part of the polymer and/or are in a mobile form. A common synthetic method for polycarbonate basicifies a bisphenol compound such as bisphenol A (BPA) or bisphenol F (BPF) to form a bis(phenoxy) salt, and condenses that product with phosgene ($COCl_2$) to form the polycarbonate. Protective coatings are applied to the interior of metal and other food and beverage containers (e.g. cans) to prevent the contents from coming into contact with the metal surfaces of the containers to prevent corrosion of the metal and contamination and deterioration of the contents.

Polycarbonates and the related bisphenolic-based epoxies and polyurethanes are colorless, tasteless, and odorless. The balance of currently available scientific evidence indicates that trace amounts of bisphenolics that might diffuse away from existing coatings, whether origination from contain mobile or bound bisphenol compounds, do not pose a significant health risk to humans. However there is a perception that some coatings such as epoxy-based coatings and the like containing mobile BPA, bisphenol F (BPF), bisphenol A diglycidyl ether (BADGE), and bisphenol F diglycidyl ether (BFDGE) are less desirable for foodstuffs storage and might soon fail to meet established government regulatory standards. Concerted efforts have been made to find replacements that are free of the bisphenol compounds. Currently, most of the promising replacement coatings are based on a combination of polyester and a polyacrylate, however, BPA- and BPF-free epoxies are not a ready option.

It would be advantageous to provide a protective coating for a packaging container (e.g., a food or beverage can) that is coated with a composition that is substantially free of mobile BPA and related compounds. These needs and other needs are addressed by the compositions, methods, and products of the present disclosure.

BRIEF SUMMARY

Provided in this disclosure are new compositions and coatings for use in food and beverage packaging. Unlike previous coating compositions that appear to be based on similar combinations of epoxy, acrylate, and/or siloxane resins, the coating compositions of this disclosure are prepared by synthesizing or crosslinking one or more of the constituent polymer resins while in the presence of the other resins, such that an interpenetrating network or intertwined combination of at least one polymer network is generated, which provides highly stable polymeric networks that are substantially free of mobile bisphenol compounds. In some embodiments the polymeric material is an interpenetrating polymer network. In certain embodiments the cross-linked reaction products of at least one resin in the intimate mixture include no cross-links to polymers formed from the other resins. In other embodiments at least some cross-links in the reaction products of at least one resin are bonds to a type of polymer from one or both of the other two resins. Regardless, the stability imparted by the intertwined combination of networks results in a coating that is substantially free of mobile bisphenol compounds.

In one aspect, there is provided a composition comprising the reaction product of an epoxy resin and an arylate resin, which can be contacted in the presence of an initiator, a catalyst, and/or a crosslinker, and wherein the resulting intertwined or interpenetrating polymer network is substantially free of mobile bisphenol compound.

In another aspect, this disclosure provides a composition comprising the reaction product of an epoxy resin and a siloxane resin, which can be contacted in the presence of a catalyst and/or a crosslinker, and if desired, an initiator, and wherein the resulting intertwined or interpenetrating polymer network is substantially free of mobile bisphenol compound.

Still a further aspect of this disclosure provides a composition comprising the reaction product of an acrylate resin and a siloxane resin, which can be contacted in the presence of a catalyst and/or a crosslinker, and if desired, an initiator, and wherein the resulting intertwined or interpenetrating polymer network is substantially free of mobile bisphenol compound.

In certain embodiments, for example, there is provided a coating having improved properties for use in food and beverage packaging, wherein the coating is from 0.1 to 20 microns thick, adheres to substrate surfaces that are substantially comprised of a metal, and comprises a polymeric material wherein:
  a) the polymeric material consists of reaction products of an intimate mixture of thermosetting resins that are selected from at least two of three categories: cyclic ether resins, acrylate resins and siloxane resins;
  b) reaction products of at least two of the thermosetting resin categories can constitute at least 20% of the polymeric material by dry weight per category, respectively;
  c) from 5% to 25% of skeletal bonds in the polymeric material can be network-forming bonds;
  d) the polymeric material can constitute at least 90% of the coating by dry weight;
  e) the coating is substantially free of BPA, BPF, BADGE and BFDGE; and
  f) the coating has a contact angle with water of at least 70 degrees;
    wherein the coating's adhesion to the substrate is substantially chemically stable under ordinary use conditions for food and beverage packaging.

In certain other embodiments there is provided a coating having improved properties for use in food and beverage packaging, wherein the coating is from 0.1 to 20 microns thick, adheres to substrate surfaces that are substantially comprised of a metal, and comprises a polymeric material wherein:
  a) the polymeric material consists of reaction products of an intimate mixture of thermosetting resins that are selected from at least two of three categories: cyclic ether resins, acrylate resins and siloxane resins;

b) reaction products of at least two of the thermosetting resin categories can constitute at least 20% of the polymeric material by dry weight per category, respectively;

c) from 5% to 25% of skeletal bonds in the polymeric material can be network-forming bonds;

d) the polymeric material can constitute at least 90% of the coating by dry weight;

e) the coating is substantially free of BPA, BPF, BADGE and BFDGE; and f) the coating has a contact angle with water of at least 70 degrees;

wherein the coating's adhesion to the substrate is substantially mechanically stable under ordinary physical stresses for food and beverage packaging.

In still other embodiments, there is provided a coating having improved properties for use in food and beverage packaging, wherein the coating is from 0.1 to 20 microns thick, adheres to substrate surfaces that are substantially comprised of a metal, and comprises a polymeric material wherein:

a) the polymeric material consists of reaction products of an intimate mixture of thermosetting resins that are selected from at least two of three categories: cyclic ether resins, acrylate resins and siloxane resins;

b) reaction products of at least two of the thermosetting resin categories can constitute at least 20% of the polymeric material by dry weight per category, respectively;

c) from 5% to 25% of skeletal bonds in the polymeric material can be network-forming bonds;

d) the polymeric material can constitute at least 90% of the coating by dry weight;

e) the coating is substantially free of BPA, BPF, BADGE and BFDGE; and f) the coating has a contact angle with water of at least 70 degrees;

wherein the coating's adhesion to the substrate is substantially chemically and mechanically stable under ordinary conditions and physical stresses for food and beverage packaging.

The present disclosure also provides an article comprising: a body portion or an end portion or both of a food or beverage can comprising a metal substrate; and a composition, disposed on at least a portion of an inside surface of the body portion or the end portion or both, comprising any of the disclosed polymeric coating compositions. There is also provided a can coated at least in part on an interior surface with any of the disclosed polymeric coating compositions.

Regarding special characteristics of the resulting resin and coating, in one aspect, the resulting coatings can have a contact angle with water of at least 70 degrees and are constituted primarily of a polymeric material that is a reaction product of an intimate mixture of thermosetting resins based on interpenetrating networks of ether resins such as cyclic ethers, acrylate resins, and/or siloxane resins. When the polymeric material is fully cured, from 5% to 25% of its skeletal bonds are network-forming bonds that form the backbone of the interpenetrating network and that are generated in the presence of the other polymer(s). The coatings adhere well to metals, are substantially free of Bisphenol A and related compounds, and are substantially chemically and mechanically stable under ordinary use conditions and stresses for food and beverage packaging.

DETAILED DESCRIPTION

The present disclosure provides a hardenable packaging composition based on combinations of two or three of the following: ethers such as cyclic ethers, acrylics and siloxanes. The compositions contain little if any bisphenol A or related compounds. This disclosure also provides methods for applying and using the composition. In particular it is useful for laminates and linings on metal surfaces for food and beverage containers, but the scope of the disclosure is not so limited. Polymers made from combinations disclosed herein have significant Tg, cross-linking density and hydrophobic character. In addition they can provide sufficient adhesion, toughness, flexibility and corrosion resistance. The hardenable compositions can undergo a plurality of polymerization modes simultaneously (radical, condensation, and/or cationic or anionic). Moreover they are cost-competitive with other approaches, while avoiding the use of isocyanates, formaldehyde and styrene as cross-linking agents. And they have minimal interaction with organoleptic agents in the products with which they come into contact.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments. Reference throughout this specification to "one embodiment" or "an embodiment" or "embodiments" means that a particular feature, structure, or characteristic described in connection with the embodiment is included in at least one embodiment. Thus, use of these terms throughout the specification does not imply that the embodiments are all the same or that all embodiments have those respective attributes. Furthermore, the particular features, structures, or characteristics may be combined in any suitable manner in one or more embodiments.

A. Definitions

The various aspects of the disclosure may be understood more clearly by reference to the following definitions for the terms as used herein.

The term "packaging" has its usual and ordinary meaning in the arts of containers, and as used herein further contemplates the use of films, coatings and laminates, and contemplates substrate layers comprised of metals, synthetic polymers, natural materials, glasses, ceramics and related materials and combinations.

The term "polymer" has its usual meaning to refer to a large molecule composed of many repeated subunits, the subunits referred to "monomers" before their polymerization and as "mers" after their polymerization. The term "polymeric material" refers to a material that is a reaction product of an intimate mixture of thermosetting resins.

The term "thermosetting resin" as used herein refers to a chemical composition that comprises monomers, polymer precursor and/or polymers, and that includes a sufficient complement of initiators, cross-linkers and/or catalysts to form a thermoset polymer during curing. The term "thermoset" as used to describe a polymer indicates that it is prepared from a thermosetting resin and that after thermosetting that it is not able to melt.

The terms "prepolymer", "polymer precursor" and "precursor polymer" are synonymous and refer to a monomer or system of monomers and/or oligomers that have been reacted to attain a molecular weight that is intermediate between monomeric and high polymeric. Use of the term herein indicates that the material is capable of further polymerization or cross-linking by reactive groups during a cure step to which the material is to be subjected.

The term "cyclic ether" as used herein with respect to a thermosetting resin refers to cyclic ethers that are polymerizable by ring-opening chain growth reactions or by attack from a nucleophile. Non-limiting illustrative examples of suitable compounds include those having one or more cyclic ethers, such as epoxides, oxetanes, oxolanes (e.g., tetrahydrofuran), dioxolanes, oxepanes and dioxepanes. In illustrative non-limiting embodiments the cyclic ether optionally has a lower alkyl or lower alkenyl or lower alkynyl substituent or is a moiety on a fatty acid or fatty ester. Guidelines for the relationship between ring size and polymerizability are well known to polymer chemists. In some preferred embodiments the cyclic ether is reacted by nucleophilic attack, such as by the attack of primary and/or secondary amines on the oxirane rings of glycidyl ethers in epoxy resins, or by attack by a phenolic species. However this disclosure is not so limited, and ring opening may be by cationic chain reaction, anionic chain reaction or olefin methathesis. In some embodiments the resin contains one or more compounds that is an aliphatic epoxy compound, cycloaliphatic epoxy compound, plant-based epoxy compound, tetrahydrofuran compound, dioxolane compound, oxepane compound or dioxepane compound, wherein the alkylene oxide ring optionally has a lower alkyl substituent.

The term "epoxy resins" refers to flexible and usually (though not always) thermosetting resins made by copolymerization of an epoxide with another compound having hydroxyl groups and used chiefly in coatings and adhesives, also known as epoxy. As used herein, the term "bis-epoxy" refers to any compound that has two epoxy groups, such as terminal epoxy groups.

The term "polyepoxide" means a polymer derived from the reaction of an epoxy resin, for instance by reaction of a diglycidyl ether with diamines, phenolics, urethanes, polyols or other compounds that have moieties that are capable of attacking and ring-opening the oxirane functional groups. The term polyepoxide also includes polymers that are formed by ring-opening chain reactions, such as polyethyleneoxide and polypropyleneoxide.

The term "acrylates" means acrylic-based monomers and the oligomers and polymers made from them. As used herein the terms acrylic and polyacrylate include alkacrylic species, e.g., methacrylates and ethacrylates. As used herein the term acrylic includes acrylic carboxylic acids, acrylic amides, and their respective esters. Thus they include, e.g., monomers and polymers of acrylic acid and its salts, acrylamide, ethyl methacrylate and methylethacrylamide. Unless otherwise indicated, a reference to a "(meth)acrylate" compound (where "meth" is bracketed) is meant to include both acrylate and methacrylate compounds. Non-limiting illustrative examples of acrylic monomers include acrylic acid, methacrylic acid, ethacrylic acid, lower alkyl esters of acrylic acid, lower alkyl esters of methacrylic acid, lower alkyl esters of ethacrylic acid, lower alkenyl esters of acrylic acid, lower alkynyl esters of methacrylic acid, and lower alkenyl esters of ethacrylic acid, wherein the lower alkyl, alkenyl and alkynyl moieties are optionally substituted with hydroxyl groups.

The term "siloxanes" mean species that have Si—O—Si linkages. The term "siloxane resin" refers to a chemical composition that is capable of forming siloxanes upon curing, regardless of whether silicon atoms in the resin are bonded by mutual oxygen atoms prior to the curing. In particular embodiments the siloxane resins and resulting polymers have organic substituents covalently bonded to Si atoms, but the disclosure is not so limited. Non-limiting illustrative examples of siloxanes in a siloxane resin include species represented by "network-forming siloxanes," meaning $Si(R^1)(OR^2)(OR^3)(OR^4)$ and/or $Si(OR^1)(OR^2)(OR^3)(OR^4)$, wherein $R^1$, $R^2$, $R^3$ and $R^4$ are independently selected from the group consisting of lower alkyl, lower alkenyl, lower alkynyl, phenyl, phenyl lower alkyl, phenyl lower alkenyl, phenyl lower alkynyl, lower alkyl phenyl, lower alkenyl phenyl, and lower alkynyl phenyl, and wherein $R^1$, $R^2$, $R^3$ and $R^4$ are optionally partially or fully fluorinated. Other non-limiting illustrative examples of siloxanes in a siloxane resin include "linear-chain-extending species," meaning $Si(R^1)(R^2)(OR^3)(OR^4)$, and/or "chain-terminating species," meaning $Si(R^1)(R^2)(R^3)(OR^4)$, wherein for each case $R^1$, $R^2$, $R^3$ and $R^4$ are as stated above. In some embodiments some or all alkoxy moieties are optionally replaced by halide atoms, primary amines, and/or secondary amines.

The term "reaction products" refers to substances generated by a chemical reaction of some type. The term "product of" as used herein with respect to a reaction refers to a substance generated by a chemical reaction.

The term "degree of polymerization" refers to the number of mers that are linked in a polymer molecule.

The term "cross-link" refers to a link between two polymer chain and another by a covalent or ionic bond. Similarly, the term "cross-linker" means a chemical compound containing at least one chemical groups (e.g., hydroxyl, carboxyl, vinyl, or blocked isocyanate) capable of undergoing inter- or intra-molecular chemical reaction to form a cross-link. In certain aspects and embodiments, cross-linkers contain at least two such groups on average. Non-limiting illustrative examples of cross-linkers for cyclic ether resins include, but are not limited to: lower alkylated melamines; lower alkylated and imino mixed ether melamines; lower alkylated ureas; formaldehyde-free modified ureas; benzoguanamine; aminoplast polymers; anhydrides; diacids; and cross-linkable polymers that are substituted by glycoluril, an amine, a hydroxyl group, a vinyl group or an isocyanate group. Non-limiting illustrative examples of cross-linkers for acrylate resins include a cross-linker in which a sugar or sugar alcohol is esterified with a plurality of moieties selected from the group consisting of acrylic, methacrylic and ethacrylic esters, wherein the sugar or sugar alcohol is characterized by a degree of polymerization of between 1 and 6, and wherein the sugar or sugar alcohol moieties in an oligomer are identical to one another or non-identical. Non-limiting illustrative examples of cross-linkers for siloxane resins include the network-forming siloxanes described above, as well as siloxanes bearing an organic substituent that bears a non-aromatic unsaturated carbon-carbon bond. In certain preferred embodiments the thermosetting resins and cross-linking chemistry are selected to obtain extensive covalent bonding between unlike resins.

The term "node" means a point at which a polymer has at least three polymer chain segments emanating from a chemical moiety.

The term "branch" refers to a polymer segment that emanates from a node. The branch may or may not have other nodes. The term cross-link is used herein to describe the chemical connection of a branch to a node regardless of whether the branch has other nodes.

The term "skeletal bond" as used herein refers to bonds that define the path of atomic relationships within a molecule in a way that defines its linearity, branching or cross-link node formation. Thus the term skeletal bond herein includes most first covalent bonds between two atoms but excludes bonds to hydrogen and excludes pi bonds. As used herein the term skeletal bond particularly applies to sigma bonds between atoms of p-block main group elements in the periodic table, as those terms are commonly understood in the art. The term skeletal bond as used herein further includes ionic bonds, particularly where they are part of a relatively stable path of relationships for linear, branched and/or cross-linked architectures.

The term "network-forming bond" is used in a collective sense and is not dependent upon identifying a particular bond in a trivalent or tetravalent atom as forming the network. For each atom that is bonded to more than two polymer chain segments (wherein such atoms are referred to as "nodes" herein), the number of such bonds beyond two is the number of network-forming bonds proceeding from that atom. As an example, silica in quartz is a highly cross-linked system in which each silicon atom is bonded to 4 different oxygen atoms. Each oxygen atom in turn is bonded to another silicon atom. Thus each silicon atom has 2 (i.e., 4-2) network-forming bonds. This term is used herein without respect to whether two chain segments that are attached to a single node may recombine at a different node to form a macrocycle, and is used without respect to whether a chain segment ultimately terminates without cross-linking or branching at some distance from the node. This guideline follows a rule of reason, for example, hydrogen atoms and usually halide moieties do not bond to more than one atom and thus bonds to them are not network-forming, although a C-halide bond may still be considered a skeletal bond though a C—H bond would not. Functional groups that have multiple atoms are not considered to comprise network-forming bonds unless more than two chain segments are bonded to them. Thus even though a 1,4-phenyldiyl group has three atoms bonded to each of its C-1 and C-4 positions, the group is part of a linear sequence so it has no network-forming bonds in that case. By contrast a 1,3,5-phenyltriyl group that attaches to three chain segments would be considered to have 1 network-forming bond (i.e., 3-1). Nevertheless carbon-carbon sigma bonds would be counted as skeletal. The same guideline applies for other cyclic groups such as polyaromatic, heteroaromatic and heterocyclic species. Various other functional groups that are relatively small and connected to no more than two chain segments—such as carbonyl, lower alkyl, lower alkenyl, lower alkynyl, nitro, amine, counterions that are not larger than lower alkyl, etc.—are not considered to be a polymer chain segment and thus are ignored when counting the number of network-forming bonds even though their skeletal bonds are still considered skeletal. Hence for example homopoly(dimethyl siloxane) is considered to have no cross-links or significant branching and thus has zero network-forming bonds. For ion pairings or clusters that have the effect of serving as nodes, e.g., polyelectrolytes, ionenes, telechelic ionomers (e.g., analogous to SURLYN® plastic), an average number of chain ends associated with the ion cluster generally will be known or plausibly estimated in order to determine how many network bonds proceed from it.

As a further illustration consider the schematic below for fused, tetramacrocyclic windowpane-like skeletal structure. Assume that each line segment between a vertex (i.e., corner) or node represents a linear sequence of 20 bonds (note that this is not the same as 20 atoms) between p-block main group elements. The four outside vertices are attached to only two segments each, thus they have no network-forming bonds. The node at the very center has four bonds to chain segments and has 2 network-forming bonds (i.e., 4-2). The nodes that the cross touches at the outside of the molecule attach to three segments each and thus each has 1 (i.e., 3-2) network-forming bond. Thus the total number of network-forming bonds is $[4\times(2-2)]+[1\times(4-2)]+[4\times(3-2)]=6$. The total number of line segments is 12, and each line segment represents 20 skeletal atoms, thus the total number of skeletal bonds is 240. The percentage of skeletal bonds that are network-forming is $(6/240)\times100\%=2.5\%$.

For a highly cross-linked system, bond-counting and ratio calculation for network-forming versus total skeletal bonds is most straightforward when an idealized theoretical unit cell for the cross-linked polymer is defined based on the numbers and ratios of monomers, cross-linkers, and their moieties that are capable of reacting or cross-reacting to form cross-links. These simplifying assumptions and approximations for calculating the number of skeletal and network-forming bonds are somewhat less exact but far more practical than performing a chemical or instrumental analysis for every polymeric material prepared according to this disclosure. In polymer chemistry it is common practice to show a repeat unit in parentheses with a half-bond at each side of the unit. For purposes of counting bonds it is clearer if a half-atom is depicted on each end of the repeating unit so that bonds can be counted without ambiguity or ambivalence. If possible the atoms shown split this way should be those that are bonded to two and only two chain segments, so that network-forming bonds in the unit cell are not overlooked or double-counted.

The schematic below shows a caricature of an illustrative unit cell for the polymeric reaction product an epoxide resin formulated from: (1) two macromolecules that are each independently the reaction product of two bisphenol A (or alternatively isosorbide, for which bond counts are the same in this system) molecules with a molecule of epichlorohydrin to form a glyceryl diether that links them and, and then with 2 more molecules of epichlorohydrin to provide the α,ω-diglycidyl ethers; (2) 1 molecule of maleic anhydride (forming the vertical line segment in the middle); and (3) 1 molecule of 1,2-ethanediamine (the horizontal line segment that crosses through the brackets at each side). The diagonal contour is then defined by BPA units. In this formation each of the four line segments at the outside of the diamond represent 23 skeletal bonds; the vertical line segment represents 9 skeletal bonds per unit cell; and the two horizontal line segments collectively represent 3 skeletal bonds per unit cell, for a total of 104 skeletal bonds. Here each of the four nodes has three skeletal bonds thus the number of network-forming bonds is $[4\times(3-2)]=4$ network-forming bonds. Then the relevant percentage of skeletal bonds that are network-forming is $(4/104)\times100\%=$ ca. 3.85%

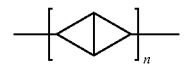

The term "catalyst" means a compound or composition for accelerating the reaction, extending the chain length of a polymer, or facilitating a cross-linking reaction. Non-limiting illustrative examples of catalysts for purposes of this disclosure include quaternary ammonium salts, quaternary phosphonium salts, tin (II) compounds, zinc (II) compounds, titanium (II) and triarylphosphines. Moreover, this disclosure contemplates the use of any catalyst that is suitable for hardening a thermosetting resin that is present in the intimate mixture.

The term "cure" as used herein with respect to a thermoset resin means to toughen or harden by polymerization and/or cross-linking, for instance by means of treatment with chemical additives, ultraviolet radiation, electron beams or heat. The term "fully cured" means the maximum amount of curing that is theoretically possible in light of the amounts and ratios of chemical species in a thermosetting resin that are capable of reacting with one another to form cross-links. The term "when cured in isolation" when used herein with respect to a thermosetting resin refers to the material and its properties that would be obtained if that resin was not mixed with any other resins prior to being cured.

The term "aromatic glycidyl ether compounds" includes but is not limited to BADGE, BFDGE, Novolac glycidyl ether (NOGE), and combinations thereof, in both the uncured and cured state.

The term "mobile" as used with respect to a compound in a particular polymeric material means that the compound can diffuse within and away from the material. For example, "mobile" may be used to refer to a compound that can be extracted from the cured coating when a coating is exposed to a test medium for some defined set of conditions, depending on the end use.

The term "substantially free" of a particular mobile compound means that the compositions of the present disclosure contain less than 1000 parts per million (ppm) of the recited mobile compound. The term "essentially free" of a particular mobile compound means that the compositions of this disclosure contain less than 100 parts per million (ppm) of the recited mobile compound. The term "essentially completely free" of a particular mobile compound means that the compositions of the disclosure contain less than 50 parts per million (ppm) of the recited mobile compound. The term "completely free" of a particular mobile compound means that the compositions of the present disclosure contain less than 20 parts per billion (ppb) of the recited mobile compound. Therefore, the disclosure that a particular composition is "completely free" of a particular mobile compound includes the disclosure that the compositions is "essentially completely free", "essentially free", and "substantially free" of that particular mobile compound, and so on. If the aforementioned phrases pertaining to relative freedom of a compound are used without the term "mobile" (e.g., "substantially free of XYZ compound"), then the compositions of this disclosure contain less than the aforementioned amount of the compound whether the compound is mobile in the polymer or bound to a constituent of a composition in which the polymer is present.

The terms "network polymer" and "network copolymer" as used herein refer to a polymer having a network architecture at the molecular scale, in which linear segments alternate with polyvalent nodes. In some embodiments these are thermosets, in others they are thermoplastic, depending on the segment lengths and extent of cross-linking, i.e., the relative frequency of nodes. Network copolymers may be random copolymers, block copolymers or branched copolymers, depending on their construction, or may be any combination of those.

The term "interpenetrating network" means a blend of two or more polymers that form an intertwined combination of networks, at least one polymer of which is synthesized and/or cross-linked in the immediate presence of the other(s).

The term "honeycomb morphology" as used herein to refer to polymers refers to a net-like array, wherein the lines of the net are constituted by one polymer and the areas between the lines are constituted by a different polymer.

The terms "hydrophobic" and "super-hydrophobic" mean water repellant, and have their usual and ordinary meaning in the chemical and polymer arts. In particular, as used herein with respect to materials, the term "hydrophobic" means that the material has a contact angle with water of at least 90 degrees.

The term "permeability" as used herein refers to the rate at which particular respective compositions permit diffusion by particular respective chemical species. For purposes of this description the term refers particularly but not exclusively to the diffusion rates of dioxygen, carbon dioxide and water molecules, respectively.

The term "functional additive" refers to a substance that is provided in relatively small quantities within a material, to modulate the physical or chemical properties of the material.

The term "food-grade" as used herein with respect to a substance means that it complies with regulatory guidelines for use in surfaces that contact food or beverages.

The term "thermoplastic" as used herein to describe a resin, polymer or formed plastic indicates that curing, if employed, does not remove its ability to melt. Non-limiting illustrative examples of such materials include thermoplastic types of polyurethanes, polyureas, poly(alkylene oxide)s, polyesters, polyimides, polysiloxanes, nondrying alkyd polymers, styrene-butadiene rubber, acrylonitrile-butadiene rubber, polybutadiene, and acrylic polymers.

The term "surface modifier" means a function additive that modulates the physical properties of a surface of a material in which the additive is present. Non-limiting illustrative examples of surface modifiers include leveling agents, wetting agents, lubricants, anti-foam agents, other hydrophobic agents, adhesion-enhancing agents and anti-corrosion agents. Non-limiting illustrative examples of functional additives used to impart hydrophobic properties for purposes of this disclosure include fatty amides, paraffin waxes, ester waxes, fatty alcohol waxes, fatty acid soaps, fatty acid esters, hydrocarbon oils, vegetable oils, uncross-linked cyclic ether resins, uncross-linked alkylpolyacrylates, siloxane surfactants, uncross-linked siloxane polymers, silicone oil, hydrated silica, fluorinated surfactants, uncross-linked fluorinated polymers, and fluorosilicones. Non-limiting illustrative examples of functional additives used to enhance adhesive properties for purposes of this disclosure include polyurethanes, alkyl(trialkoxy)silanes, aminoalkyl (trialkoxy)silanes, and acrylic polymers. Non-limiting illustrative examples of functional additives used to enhance anti-corrosion properties for purposes of this disclosure include pharmaceutically acceptable zinc (II) salts, pharmaceutically acceptable copper (II) salts, tannic acid, butylated hydroxyanisole (BHA), and butylated hydroxytoluene (BHT).

The term "blush rating" as used herein with respect to a coating or laminated film means the extent of adhesion loss during a test, as manifested by the degree of opaqueness;

values range from a high for perfect transparency (score of 10) to a low for complete opacity (score of 1 or 0).

The term "adhesion rating" as used herein with respect to a coating or laminated film means the extent of adhesion loss during a test, measured by scribing the coating or laminated film with cross-hatches before testing, and evaluating whether application and removal of tape at the surface after the test removes coating. As for blush, a top score is 10 and the low is 0 or 1.

The term "remains substantially intact" as used herein with respect to adhesion of a coating after testing means having no significant visible defects, a blush rating of at least 7 and an adhesion rating of at least 7.

The phrase "coating integrity remains substantially unaffected" with respect to a test means that the extent of defects that are visible to the naked eye does not increase significantly, and that each of the blush rating and adhesion rating after such a test falls by no more than one unit relative to the rating before the test.

The terms "film" and "sheet" are used interchangeably herein with respect to polymers and refer to free-standing or laminated thin planar formats of material that optionally may be bent, folded, twisted, seamed, crumpled or otherwise used as a wrapping or other packaging material as desired. The term "coating" and "coat" are used interchangeably herein and refer to a deposited layer on a substrate material, but by distinction from the terms of this paragraph refers to a thin film of material that adheres to a surface and that may or alternatively may not have the requisite physical robustness to be used as a free-standing film in practical applications.

The term "organoleptic" means the aspects of beverages and foods as experienced by the senses, including taste, aroma, appearance, sound and mouth feel. As used herein the term organoleptic particularly refers to the taste and aroma, but not to the total exclusion of the other sensory attributes.

The term "organoleptic marker compound" means a compound of which the physical properties are treated as representative of or as a proxy for the behavior of a complex mixture of organoleptic compounds in analytical evaluations. Illustrative examples of organoleptic marker compounds include but are not limited to the following: benzaldehyde, vanillin, (E)-2-pentenal, hexanal, heptanal, (E)-2-hepental, octanal, nonanal, (E)-2-nonenal, (E,E)-2,4-nonadienal, decanal, (E)-2-decenal, (E,E)-2,4-decadienal, (E)-2-undecenal, dodecanal, acetic acid, hexanoic acid, heptanoic acid, octanoic acid, nonanoic acid, decanoic acid, (E,E)-2,4-nonadienal, methyl propionate, methyl butanoate, ethyl butanoate, ethyl-2-methylbutanoate, ethyl hexanoate, methyl nonanoate, cineole, camphor, D-carvone, 2-hexanone, 2-heptanone, 2-octanone, 2-nonanone, ethanol, 1-pentanol, 1-hexanol, 1-heptanol, 1-octanol, 3-pentanol, 1-octen-3-ol, 2-methyl-propanol, 2-hexanol, malthol, tetrahydrofurfuryl alcohol, phenylethyl alcohol, (E)-carveol, (Z)-carveol, thymol, linalool, alpha-terpineol, eugenol, isoeugenol, 1-octen-3-one, beta-damascenone, alpha-ionone, beta-ionone, nootkatone, 1,8-cineone, p-cymene, dehydro-p-cymene, alpha-pinene, myrcene, limonene, beta-phellandrene, gamma-terpinene, terpinolene, and 2-pentyl furan. In certain embodiments the marker compounds are limonene and $C_6$ to $C_{12}$ aldehydes.

The term "comprised primarily of" as used herein with respect to the proportion of a substance in an item means that the substance constitutes at least 70% mass percent of that item by dry weight.

The term "synthetic" as used with respect to compounds means that they are not products of nature. A product of nature for which the chemical structure has been altered by a man-made reaction is considered to be synthetic herein unless the end product at issue is also found in nature, and unless its release into a food or beverage at observed levels would be considered harmless to humans and acceptable for purposes of regulatory compliance. An example of a compound fitting the latter description would be glucose obtained by industrial hydrolysis of cellulose or starch.

The term "removing" as used with respect to solvent means that the solvent is removed. The means for removal may be by heating, evacuating, lyophilizing, drying with a stream of hot air, freeze drying or other means.

The term "remove" as used with respect to a coating means that the affected portion of the coating is detached, disconnected, reduced or substantially eliminated by a means such as physical force (e.g., scraping); degradation by a laser beam; degradation by heat; removal of a substrate mask; etching without use of an overlaying mask; solvent-based delamination without use of an overlaying mask; and deposition of an overlaying mask followed by degradation of coating portions that are not protected by the overlaying mask. Coating removal by the various means may be undertaken before or after curing.

The term "drying" as used with respect to water and other solvents herein means removing them.

The terms "deposit" and "deposition" have their usual and ordinary meanings in coating fabrication. Non-limiting illustrative examples of deposition methods for purposes of this disclosure include dipping, brushing, rolling, spraying, ink jet printing, flexography, hot wax dye transfer, screen printing, block printing, movable type, static or rotary printing press, lithography, offset printing, pad printing, relief printing, rotogravure, and intaglio, wherein these terms have their usual and ordinary meanings in printing.

The term "closure" means a piece part for closing and optionally sealing the mouth of a container. Non-limiting illustrative examples include crown caps, screw caps, lids, pull-tabs, corks, stoppers, zip-lock parts, snaps, zippers, hook fabric, loop fabric, resealable tape and magnetic closures. The terms hook fabric and loop fabric refer to closure sections of the type used in VELCRO® pieces.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups. The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups.

The terms "lower alkyl" and "lower alkenyl" and "lower alkynyl" refer to alkyl, alkenyl and alkynyl functionalities that have from 1 to 6 carbon atoms. In certain embodiments the alkyl or alkyenyl group may be substituted by a hydroxyl group, alkoxy group, thiol, alkylthio group, halide, amine, substituted amine, amide, substituted amide, esterified amide, carboxylic acid or salt or ester, sulfonic acid or salt or ester, phosphonic acid or salt or ester, nitrile, or nitro group, provided that the entire number of carbon atoms in the alkyl, alkenyl or alkynyl group as substituted does not exceed 8.

The term "Ar" refers to a divalent aryl group (i.e., an arylene group), which refers to a closed aromatic ring or ring system such as phenylene, naphthylene, biphenylene, fluorenylene, and indenyl, as well as heteroarylene groups (i.e., a closed ring hydrocarbon in which one or more of the atoms in the ring is an element other than carbon (e.g., nitrogen, oxygen, sulfur, etc.). Heteroaryl groups include, but are not limited to, furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, and thiadiazolyl. When such heteroaryl groups are divalent, they are typically referred to as "heteroarylene" groups (e.g., furylene, pyridylene, etc.).

Substitution is anticipated on the organic groups of the compounds described in the present disclosure. As a means of simplifying the discussion and recitation of certain terminology used throughout this disclosure, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxyl, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only unsubstituted, open chain saturated hydrocarbon alkyl substituents, such as methyl, ethyl, propyl, t-butyl, and the like.

As used herein, the term "acidic" refers to media in which an acid or acids having a $pK_a$ (or average $pK_a$ if more than one acid is used) of less than about 5 or less than about 3. It will be appreciated that an acidic medium may result when using any number of the acid catalysts that may be used for curing polymer-based compositions.

As used herein, the term "multi-coat coating system" is defined as a coating system employing the application of at least two chemically distinct coating compositions to a particular substrate surface.

The term "two-coat coating system" is defined as a multi-coat coating system in which only two chemically distinct coating compositions are applied to a particular substrate surface.

The term "under-coat composition" is defined as the coating composition to be applied between a surface of a substrate and an "over-coat composition," and is synonymous with base-coat, primer or size for a two-coat system.

The term "over-coat composition" is defined as the coating composition to be applied over an applied under-coat composition, and is synonymous with top-coat or lacquer for a two-coat coating system.

The term "first-coat composition" is defined as the coating composition to be applied to the surface of a substrate or between a surface of a substrate and a "second-coat composition," and is synonymous with base-coat, primer or size for a two-coat coating system.

The term "second-coat composition" is defined as the coating composition to be applied over an applied first-coat composition, and is synonymous with top-coat or lacquer for a two-coat coating system.

The term "cured coating composition" is defined as the adherent coating residing on a substrate resulting from at least partially curing or hardening a coating composition, for example, by film formation, cross-linking, and the like.

The term "coating solids" is defined as including all non-volatile materials that remain in the "cured coating composition" on the coated substrate after curing.

The term "dispersed in" with respect to a polymer "dispersed in" a carrier liquid means that the polymer can be mixed into a carrier liquid to form a macroscopically uniform, multiphase (e.g. solid/liquid) fluid mixture, and is intended to include mixtures wherein the carrier liquid solvates, swells or partially-solubilizes the dispersed polymer.

The term "substantially nonaqueous carrier liquid" is used to denote a carrier liquid in which water, if present at all, constitutes no more than about five percent by weight of the carrier liquid.

B. Compositions for Reducing Flavor Loss or "Scalping"

As known to the skilled person, "flavor scalping" describes the loss of quality of a packaged item due to either its aroma flavors being absorbed by the packaging material or the components contained in the packaged item absorbing undesirable flavors from the packaging. In some scenarios, chemicals are leached from the packaging material into the foodstuffs contained in the packaging, which causes off-taste and/or odor. Also, food aromas may be absorbed by the packaging materials, leaving foodstuff contained in the packaging with a less than desirable smell and/or taste. In essence, chemical reactions may occur between the foodstuffs and the packaging materials to form new aromas and/or odors. The compositions and coatings of this disclosure reduce flavor loss or scalping and reduce or minimize the leaching of chemicals from the packaging material into the foodstuffs contained in the packaging.

The new polymeric compositions and coatings of this disclosure, unlike previous coating compositions that appear to be based on similar combinations of precursor materials (epoxy, acrylate, and/or siloxane resins), are prepared by synthesizing and/or crosslinking one or more of the constituent polymer resins while in the presence of the other resins. By synthesizing and/or crosslinking at least one constituent polymer resin in this manner, an interpenetrating network or intertwined combination of at least one polymer network is generated, which provides highly stable polymeric networks that are substantially free of mobile bisphenol compounds.

Without being limited to any specific theory, the present disclosure includes three coating composition platforms that are expected to reduce flavor scalping, because of the following factors: (a) A high glass transition temperature Tg and high crosslinking density of the composition may reduce the free volume of the polymer network of the compositions. This may result in decreased solubility and diffusivity of small flavor molecules, which may reduce flavor scalping; (b) a hydrophobic coating surface will be used to coat substrates. Therefore, beverage or liquid food, which are typically hydrophilic, may be repelled from the composition of the coating surface and this may reduce the flavor absorption by the packaging composition; (c) the overall polarity of the coating compositions will be reduced via long chain and other non-polar monomers. Therefore, the solubility of flavor compounds may be reduced; (d) flavor compounds may be used as additives to fill the void/free volume of the composition polymer network and may decrease the overall flavor diffusion/absorption; and (e) the coating surface will have release properties similar to "silicone release liners". Therefore, the diffusion rate of flavor molecules into the polymer network of the compositions may be reduced.

In one aspect, there is provided a composition comprising the reaction product of an epoxy resin and an arylate resin, which can be contacted in the presence of an initiator, a catalyst, and/or a crosslinker, and wherein the resulting intertwined or interpenetrating polymer network is substantially free of mobile bisphenol compound.

Suitable Resin Combinations.

Combining and intimately mixing thermosetting resins from at least two of three categories—cyclic ethers, acrylates, and siloxanes—and curing them can yield compositions for use in articles, films, laminates and coatings that are suitable to replace polymeric compositions based on BPA and compounds related to BPA. In some embodiments these compositions are cyclic-ether/acrylate (E+A) compositions, that may further comprise a cross-linker and a catalyst. In certain embodiment these compositions are cyclic-ether/siloxane (E+S) compositions that may further comprise a cross-linker and a catalyst. In still other embodiments these compositions are acrylate/siloxane (A+S) compositions. In certain embodiments these compositions are cyclic-ether/acrylate/siloxane (E+A+S) compositions, that may further comprise a cross-linker, an initiator and a catalyst. In each case the compositions may be prepared in a manner that is substantially free of BPA, essentially free of BPA, essentially completely free of BPA, or completely free of BPA. The weight ratios for the polymers may be selected from a range, as discussed below; the order of polymer names listed in this paragraph and below does not designate the relative dominance in such ratios.

Applications of the Polymer.

The compositions according to this disclosure are suitable for use in molded articles, free standing films, laminated articles and surface coatings. In some aspects and embodiments the compositions disclosed herein are used in laminates and protective surface coatings for metal substrates. In particular the metal surfaces may be those of food and beverage cans, and comprised of aluminum, aluminum alloys, steel, steel alloys, tin, tin alloys, zinc, zinc alloys, chrome and chrome alloys, and other packaging metals, but this disclosure is not so limited.

The compositions according to this disclosure may also be used in laminates and protective surface coatings for plastic substrates including but not limited to substrates that are synthetic polymers or biopolymers such as polyethylene, polypropylene, polyvinylchloride, polyethylene terephthalate, polyethylene furanoate, nylons, polycarbonates, acrylics, polyurethanes, silicones, natural phenolic polymers, terpene polymers, and lipid polymers. In addition this disclosed compositions also may be used in laminates and protective surface coatings for substrates that comprise polysaccharide substrates, including but not limited to cellulose, lignocellulose, hemicellulose, dextran, glycogen, pullulan, starch, chrysolaminarin, curdlan, laminarin, lentinan, lichenin, pleuran, zymosan, pectin, chitin, glycosaminoglycans, callose, and plant gums.

The disclosed compositions may further be used in laminates and protective surface coatings for substrates that comprise inorganic materials, including but not limited to glasses, ceramics and glass-ceramics. Non-limiting examples of glasses which may be used according to this disclosure include glasses such as fused silica glass, soda-lime-silica glass, borosilicate glasses, lead-oxide glass, aluminosilicate glass, germaninum oxide glass, and photochromic glasses. Non-limiting examples of ceramics which may be used according to this disclosure include: whitewares such as earthenware, stoneware, porcelain, bone china; technical ceramics such as oxides of alumina, beryllia, ceria and zirconia; technical ceramics such as carbides, borides, nitrides and silicides; and technical ceramics such as composites reinforced by particles or fibers and such as composites of oxides and nonoxides. Non-limiting examples of glass-ceramics which may be used in accordance with this disclosure include, for example, the $Li_2O \times Al_2O_3 \times nSiO_2$—System (LAS-System), the $MgO \times Al_2O_3 \times nSiO_2$—System (MAS-System), and the $ZnO \times Al_2O_3 \times nSiO_2$—System (ZAS-System).

The compositions are suitable for both the interior and exterior coatings of containers for foods and beverages, and particularly suitable for the interior coatings of such containers, where the coating contacts the food or beverage.

The polymer constituents may form thermoplastics or thermosets, which will depend on the extent of cross-linking and somewhat on the extent of entanglement. The composition may be diverse. In some embodiments, in addition to including a polymer from each of at least two of the categories—polyacrylates, polyepoxides and or polysiloxanes—at least one category is represented by the presence of more than one polymer. In certain embodiments the composition comprises at least one polymer from outside the three categories that is blended with or bonded to one or more monomers or polymers from the categories. Examples of polymers from outside the categories include polyurethanes, polyureas, polyesters, polyimides, polymerized alkyds, styrene-butadiene rubbers, acrylonitrile-butadiene rubbers, polybutadienes, or, in general, reactive resins for the production of thermoset polymers.

In some embodiments, the compositions are substantially free of mobile BPA, BPF, BADGE, and BFDGE. In other embodiments, the compositions are essentially free of mobile BPA, BPF, BADGE, and BFDGE. In certain embodiments the compositions are essentially completely free of mobile BPA, BPF, BADGE, and BFDGE. In still other embodiments, the compositions are completely free of BPA, BPF, BADGE, and BFDGE.

C. Polymer Precursors

In some embodiments the composition comprises polymer precursors, i.e., molecules that are oligomeric or otherwise larger than small molecules and containing one or more functional groups that are curable, e.g., by exposure to heat or an energy source such as an electron beam, ultraviolet light, visible light, etc., or by the action of moisture, a chemical catalyst, or other agent. The composition may contain no such precursors, for instance if only monomers or only polymers are present, or optionally may contain a precursor for a polymer from any of the three categories, or precursors for polymers from any combination of the three categories. In addition, precursors for polymers from one category may be hybridized or bonded with monomers, polymers or precursors from another category. Non-limiting illustrative precursors for epoxy resins include, but are not limited to: reactive compounds for forming amino or aminoplast polymers, such as alkylated urea-formaldehyde polymer, melamine-formaldehyde polymer, alkylated benzoguanamine-formaldehyde polymer, glycidyl epoxy resins, cycloaliphatic epoxides, and glycidylamine epoxy resins. Non-limiting illustrative precursors for acrylate resins include those based on acrylate and alkacrylate polymers, alkyl acrylates, acrylated epoxy, acrylated urethane, acrylated polyester, acrylated polyether, vinyl ether, acrylated oil, and acrylated silicone. Non-limiting illustrative precursors for polysiloxanes include alkylalkoxysilane oligomers; and reactive vinyl polysiloxanes. In some embodiments a precursor for a polymer that is outside of the three categories is provided for purposes of cross-linking, plasticization, barrier property improvement, or another benefit. Non-limiting illustrative precursors for such "off-category" polymers include precursors for: alkyd polymer such as urethane alkyd polymer; polyester polymer; reactive urethane polymer; phenolic polymer; phenolic/latex polymer; and the like. The compositions may include a monomer, an oligomer, a polymer, or a combination thereof. In particular embodiments, the composition includes monomers of at least two types of polymers that when cured may form cross-links. For example, the compositions may include epoxy constituents and acrylic constituents that, when cured, form an epoxy/acrylic polymer.

D. Cyclic Ethers

Ring-Opening of Non-Epoxide Cyclic Ethers.

The compositions may include one or more components having non-epoxide polymerizable oxygen-containing rings. Non-limiting illustrative examples include oxetane compounds, oxolane (e.g., tetrahydrofuran) compounds, dioxolane compounds, oxepane compounds and dioxepane compounds, wherein the alkylene oxide ring optionally has a lower alkyl substituent.

In an exemplary embodiment, the polymer reaction components include anionically and cationically polymerizable precursors. For example, the compositions may include at least one cationically curable component, e.g., at least one cyclic ether component, cyclic lactone component, cyclic acetal component, cyclic thioether component, spiro orthoester component, epoxy-functional component, or oxetane-functional component. In some embodiments, the compositions include at least one component selected from the group consisting of epoxy-functional components and oxetane-functional components.

Epoxy-Functional Components.

In some embodiments, the compositions include at least one epoxy-functional component, e.g., an aliphatic epoxy-functional component ("aliphatic epoxy"). Epoxy-functional components are components comprising one or more epoxy groups, i.e., one or more three-member ring structures (oxiranes). The monomer mixture may contain at least about 0.1% or at least about 1% by weight of an oxirane group-containing monomer, based on the weight of the monomer mixture. In other embodiments, the oxirane group-containing monomer may constitute about 0.1% to about 30% or about 1% to about 20% by weight of the monomer mixture. In some embodiments, the monomer mixture does not contain any oxirane-group containing monomer.

Diepoxides.

Polymers having reaction products of Formula I may be prepared by methods that involve polymerizing or further polymerizing compounds of Formula II. Formula I: —O—Ar—$R_n$—C(O)—O—$R^1$—O—C(O)—$R_n$—Ar—O— wherein each Ar is independently a divalent aryl group (i.e., an arylene group) or heteroarylene group; $R^1$ is a divalent organic group; each R is independently a divalent organic group; and n is 0 or 1. Any one polymer may have a variety of such segments, which may be the same or different. Formula II: HO—Ar—$R_n$—C(O)—O—$R^1$—O—C(O)—$R_n$—Ar—OH wherein Ar, R, $R^1$, and n are as defined above.

In certain embodiments, compounds of Formula II (e.g., dihydric phenols) can be reacted with a diepoxide to increase the molecular weight. For example, compounds of Formula II (e.g., dihydric phenols) may be reacted with non-BPA and non-BPF based diepoxides much in the same manner that Bisphenol A or Bisphenol F do, to create polymers that can be formulated with cross-linkers and additives for coatings for rigid packaging. For example, compounds of Formula II may be reacted with a diepoxide to form a polymer that includes —$CH_2$—CH(OH)—$CH_2$— segments. Alternatively, compounds of Formula II may be reacted with epichlorohydrin to form a diepoxide analog of compounds of Formula II, which may then be reacted with other compounds of Formula II to form a polymer that includes —$CH_2$—CH(OH)—$CH_2$— segments.

The diepoxide analogs of compounds of Formula II (e.g., glycidyl polyethers of the dihydric phenols) may be prepared by reacting suitable proportions of a compound of Formula II (e.g., dihydric phenol) and epichlorohydrin in an alkaline medium. The desired alkalinity may be obtained by adding basic substances, such as sodium or potassium hydroxide, preferably in stoichiometric excess to the epichlorohydrin. The reaction may be accomplished at temperatures of about 50° C. to about 150° C. The heating may be continued for several hours to effect the reaction and the product is then washed free of salt and base. Procedures for such reactions are generally well known and disclosed, for example, in U.S. Pat. No. 2,633,458.

As used in the present disclosure, suitable diepoxides (other than the diepoxide analogs of compounds of Formula II) may include BPA- or BPF-free diepoxides, preferably with one or more ether linkages. Suitable diepoxides may be prepared by a variety of processes, for example, by the condensation of a dihydroxy compound and epichlorohydrin. Examples of suitable diepoxides (other than the diepoxide analogs of compounds of Formula II) include, but are not limited to, 1,4-cyclohexanedimethanol diglycidyl ether (CHDMDGE), resorcinol diglycidyl ether, neopentyl glycol diglycidyl ether, and 2-methyl-1,3-propandiol diglycidyl ether.

The resultant polymers of Formula I may be epoxy terminated or phenoxy terminated, for example. They may be made in a variety of molecular weights, such as the molecular weights of commercially available BPA-based epoxy materials (e.g., those available under trade designations such as EPON 828, 1001, 1007, 1009 from Resolution Performance Products, Houston, Tex. USA). In some embodiments, polymers of the present disclosure have a number average molecular weight (Mn) of at least about 2,000, at least about 3,000, or at least about 4,000.

The molecular weight of the polymer may also be enhanced by the use of a catalyst when reacting a diepoxide (whether an analog of Formula II or another diepoxide) with a compound of Formula (II). Suitable catalysts usable in the advancement of the molecular weight of the epoxy material of the present disclosure include amines, hydroxides (e.g., potassium hydroxide), phosphonium salts, and the like. In some embodiments, the catalyst is a phosphonium catalyst.

Alternatively, the epoxy-terminated polymers of Formula I may be reacted with fatty acids to form polymers having unsaturated (e.g., air-oxidizable) reactive groups, or with acrylic acid or methacrylic acid to form free radically curable polymers.

The molecular weight of the polymer may also be enhanced by the reaction of an epoxy-terminated polymer of Formula I with a suitable diacid (such as adipic acid).

Bio-Sourced Components.

In certain embodiments the epoxy resin is obtained by the use of bio-sourced compounds. For instance, epichlorohydrin may be generated from glycerol that is obtained from vegetable oils. Also, the rigid diol BPA may be replaced by rigid diols from bicyclic dianhydro $C_6$ sugar alcohols, such as isosorbide, isomannide, isoidide, isogalactide, isofucide and isoinoside. Isosorbide is particularly attractive because it is readily available, being a product of corn starch. Additionally plant-based epoxy resins such as epoxidized soybean oil may be used.

Aliphatic Epoxy Components.

Aliphatic epoxy components may have one or more epoxy groups and may be free of aromatic rings. The compositions may include one or more aliphatic epoxies. Examples of a aliphatic epoxies include, but are not limited to, glycidyl ether of $C_2$-$C_{30}$ alkyl; 1,2 epoxy of $C_3$-$C_{30}$ alkyl; mono- or multi-glycidyl ether of an aliphatic alcohol or polyol such as 1,4-butanediol, neopentyl glycol, cyclohexane dimethanol, dibromo neopentyl glycol, trimethylol propane, polytetramethylene oxide, polyethylene oxide, polypropylene oxide, glycerol, and alkoxylated aliphatic alcohols; or polyols.

In an embodiment, the aliphatic epoxy includes one or more cycloaliphatic ring structures. For example, the aliphatic epoxy may have one or more cyclohexene oxide structures, for example, two cyclohexene oxide structures. Examples of an aliphatic epoxy comprising a ring structure include, but are not limited to, hydrogenated, bis(4-hydroxycyclohexyl)methane diglycidyl ether, 2,2-bis(4-hydroxycyclohexyl)propane diglycidyl ether, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, di (3,4-epoxycyclohexylmethyl)hexanedioate, di(3,4-epoxy-6-methylcyclohexyl methyl) hexanedioate, ethylenebis(3,4-epoxycyclohexanecarboxylate), ethanedioldi(3,4-epoxycyclohexylmethyl)ether, 2-(3,4-epoxycyclohexyl-5,5-spiro-3,4-epoxy) cyclohexane-1,3-dioxane, or 1,4-cyclohexanedimethanol diglycidyl ether.

It will be appreciated that the epoxy groups of the bis-epoxy react with the hydroxy groups of the phenolic carboxylic acids and/or esters to form a bis-carboxylic acid or a bis-ester. The bis-carboxylic acid or bis-ester is then reacted with a polyol to form a polyester. The bis-epoxy may be reacted with the phenolic carboxylic acids and/or esters in a ratio of 1.1:2, such as about 1.5:2, about 1:1.5, about 1:1 to about 1:2, or about 1:2. In some embodiments, monophenolic carboxylic acid/esters are used, and include the esters of parahydroxybenzoic acid or "parabens", such as methyl paraben, ethyl paraben, propyl paraben, butyl paraben, isobutyl paraben, isopropyl paraben and/or benzyl paraben. In certain embodiments, di-phenolic carboxylic acids/esters include diphenolic acid. It will be appreciated that when using a phenolic carboxylic acid and/or ester with more than one —OH group, conditions should be maintained so as to avoid gelling of the product.

Polyols.

In some embodiments, the compositions include one or more mono- or poly-glycidylethers of aliphatic alcohols, aliphatic polyols, polyesterpolyols or polyetherpolyols. Examples of such a component include, but are not limited to, 1,4-butanedioldiglycidylether, glycidylether of polyoxyethylene or polyoxypropylene glycol or triol of molecular weight from about 200 to about 10,000; glycidylether of polytetramethylene glycol or poly(oxyethylene-oxybutylene) random or block copolymers.

In some embodiments, commercially available glycidylether may include an epoxy modifier such as: Heloxy 48, Heloxy 67, Heloxy 68, Heloxy 107, Grilonit F713, Heloxy 71, Heloxy 505, Heloxy 7, Heloxy 8, or Heloxy 61 (sold by Resolution Performances).

In some embodiments, suitable diols, triols, and polyols include, but are not limited to, ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, hexylene glycol, cyclohexanedimethanol, a polyethylene or polypropylene glycol having a weight average molecular weight (MW) of about 500 Da or less, isopropylidene bis(p-phenylene-oxopropanol-2), and mixtures thereof.

In certain embodiments, the polyol mixture includes at least one tri-hydroxy alcohol (e.g., triol), but is predominantly composed of one or more di-hydroxy alcohol (e.g., glycol or diol). Suitable tri-hydroxy alcohols may include, for example, trimethylolethane, trimethylopropane, pentaerythritol, dipentaerythritol, glycerol, and mixtures thereof. In some embodiments, the triols are trimethylolethane and trimethylopropane. In particular embodiment, the di-hydroxy alcohols include, for example, ethylene glycol, propylene glycol, 1,2- and/or 1,3-propanediol, diethylene glycol, dipropylene glycol, triethylene glycol, tetraethylene glycol, 1,4-butanediol, 1,3-butylethylpropanediol, 2-methyl-1,3-propanediol, 1,5-pentanediol, cyclohexanedimethanol, glycerol, 1,6-hexanediol, neopentyl glycol, pentaerythritol, 1,4-benzyldimethanol and -ethanol, 2,4-dimethyl-2-ethylhexane-1,3-diol, and mixtures thereof. Diols may be used in certain embodiments. Example diols may include, but are not limited to, ethylene glycol, propylene glycol, diethylene glycol, neopentyl glycol, and mixtures thereof.

E. Polyacrylates

Acrylates:

In some embodiments, the ethylenically unsaturated hydroxyl-functional monomers include, but are not limited to, monomers having a reactive carbon-carbon double bond and a hydroxyl group. Examples of suitable alkyl (meth) acrylate esters include, but are not limited to, methyl, ethyl, propyl, isopropyl, butyl, isobutyl, pentyl, isoamyl, hexyl, 2-ethylhexyl, octyl, nonyl, decyl, isodecyl, lauryl, and isobornyl (meth)acrylates. Aromatic (meth)acrylate ester co-monomers (e.g. cyclohexyl and benzyl (meth)acrylate)

may also be used. In certain embodiments, (meth)acrylic esters are the methyl and ethyl esters of methacrylic acid or mixtures of such esters.

Suitable alkyl(meth)acrylates may include those having the structure: $CH_2=C(R^1)-CO-OR^2$ wherein $R^1$ is hydrogen or methyl, and $R^2$ is an alkyl group containing one to sixteen carbon atoms. The $R^2$ group may be substituted with one or more, and typically one to three, moieties such as hydroxyl, halo, phenyl, and alkoxy, for example. Suitable alkyl(meth)acrylates therefore encompass hydroxy alkyl (meth)acrylates. The alkyl(meth)acrylate typically is an ester of acrylic or methacrylic acid. In some embodiments, $R^1$ is hydrogen or methyl and $R^2$ is an alkyl group having two to eight carbon atoms. In other embodiments, $R^1$ is hydrogen or methyl and $R^2$ is an alkyl group having two to four carbon atoms.

Examples of suitable alkyl(meth)acrylates include, but are not limited to, methyl(meth)acrylate, ethyl(meth)acrylate, propyl(meth)acrylate, isopropyl(meth)acrylate, butyl(meth)acrylate, isobutyl(meth)acrylate, pentyl(meth)acrylate, isoamyl(meth)acrylate, hexyl(meth)acrylate, 2-ethylhexyl (meth)acrylate, cyclohexyl(meth)acrylate, decyl(meth)acrylate, isodecyl(meth)acrylate, benzyl(meth)acrylate, lauryl(meth)acrylate, isobornyl(meth)acrylate, octyl(meth)acrylate, nonyl(meth)acrylate, hydroxyethyl acrylate (HEA), hydroxyethyl methacrylate (HEMA), hydroxypropyl(meth)acrylate (HPMA).

Cross-Linkable Mers (Radical Type):

Difunctional (meth)acrylate monomers may be used in the monomer mixture as well. Examples include ethylene glycol di(meth)acrylate, 1,6-hexanediol di(meth)acrylate, allyl methacrylate, and the like. In some embodiments the disclosure provides for the use of microwaves to cure acrylate species in the presence of itaconic anhydride to achieve higher MW and vary the chain composition of the final polymers.

Functional Ethylenically Unsaturated Components:

Examples of monofunctional ethylenically unsaturated components include, but are not limited to, acrylamide, N,N-dimethylacrylamide, (meth)acryloylmorpholine, 7-amino-3,7-dimethyloctyl(meth)acrylate, isobutoxymethyl (meth)acrylamide, isobornyloxyethyl (meth)acrylate, isobornyl(meth)acrylate, 2-ethylhexyl(meth)acrylate, ethyldiethylene glycol (meth)acrylate, t-octyl(meth)acrylamide, diacetone (meth)acrylamide, dimethylaminoethyl(meth)acrylate, diethylaminoethyl(meth)acrylate, lauryl (meth)acrylate, dicyclopentadiene (meth)acrylate, dicyclopentenyloxyethyl (meth)acrylate, dicyclopentenyl(meth)acrylate, N,N-dimethyl(meth) acrylamidetetrachlorophenyl (meth)acrylate, 2-tetrachlorophenoxyethyl (meth)acrylate, tetrahydrofurfuryl(meth)acrylate, tetrabromophenyl(meth)acrylate, 2-tetrabromophenoxyethyl (meth)acrylate, 2-trichlorophenoxyethyl(meth)acrylate, tribromophenyl(meth)acrylate, 2-tribromophenoxyethyl(meth)acrylate, 2-hydroxyethyl (meth)acrylate, 2-hydroxypropyl(meth)acrylate, vinylcaprolactam, N-vinylpyrrolidone, phenoxyethyl(meth)acrylate, butoxyethyl(meth)acrylate, pentachlorophenyl (meth)acrylate, pentabromophenyl(meth)acrylate, polyethylene glycol mono(meth)acrylate, polypropylene glycol mono(meth)acrylate, bornyl(meth)acrylate, methyltriethylene diglycol (meth)acrylate, or a combination thereof.

In some embodiments, the polyfunctional ethylenically unsaturated component includes ethylene glycol di(meth)acrylate, dicyclopentenyl di(meth)acrylate, triethylene glycol di(meth)acrylate, tetraethylene glycol di(meth)acrylate, tricyclodecanediyldimethylene di(meth)acrylate, trimethylolpropane tri(meth)acrylate, ethoxylated trimethylolpropane tri(meth)acrylate, propoxylated trimethylolpropane tri (meth)acrylate, tripropylene glycol di(meth)acrylate, neopentyl glycol di(meth)acrylate, 1,4-butanediol di(meth)acrylate, 1,6-hexanediol di(meth)acrylate, polyethylene glycol di(meth)acrylate, (meth)acrylate-functional pentaerythritol derivatives (e.g., pentaerythritol tri(meth)acrylate, pentaerythritol tetra(meth)acrylate, dipentaerythritol hexa(meth)acrylate, dipentaerythritol penta(meth)acrylate, or dipentaerythritol tetra(meth)acrylate), ditrimethylolpropane tetra(meth)acrylate, or a combination thereof.

The compositions may also contain a (meth)acrylic (co)polymer (e.g., a carboxy-functional, hydroxy-functional, or oxirane-functional (meth)acrylic (co)polymer). In an embodiment, the (meth)acrylic (co)polymer is formed from at least one functional, ethylenically unsaturated monomer or oligomer (e.g., a carboxyl-functional, hydroxyl-functional or oxirane-functional vinyl monomer or oligomer) that is reacted with other ethylenically unsaturated (e.g. vinyl (meth)acrylic) co-monomers to form the functional (meth)acrylic (co)polymer. The functional (meth)acrylic (co)polymer may be present in the over-coat composition in an amount from about 2.5 to about 30 percent, from about 5 to about 20 percent, or from about 7.5 to 18 percent by weight of the over-coat composition on a non-volatile solids basis.

The (meth)acrylic (co)polymer may have a weight average molecular weight (MW) from about 1,000 to about 50,000 Da, from about 2,000 to about 25,000 Da, or from about 5,000 to about 10,000 Da. The glass transition temperature of the (meth)acrylic (co)polymer may range from about −24° C. to about 105° C. or from about 50° C. to about 90° C.

The (meth)acrylic (co)polymer may be capable of undergoing cross-linking with one or more of the over-coat cross-linker, the under-coat cross-linker, and/or the polyester (co)polymer. In some embodiments, the (meth)acrylic (co)polymer is a (co)polymer containing one or more functional groups selected from carboxyl, hydroxyl, and oxirane.

In certain embodiments, the (meth)acrylic (co)polymers contain at least one carboxyl group or one oxirane functional group, optionally in combination with one or more hydroxyl groups.

In embodiments, the (meth)acrylic (co)polymer is a copolymer of methacrylic acid (MA) and acrylic acid (AA) with ethyl methacrylate and butyl methacrylate; a copolymer of 2-hydroxyethylmethacrylate (HEMA) with ethyl methacrylate; a copolymer of glycidyl methacrylate (GMA) with ethyl methacrylate, or a copolymer of glycidyl methacrylate with hydroxypropylmethacrylate and styrene. In certain embodiments, the MA, AA or HEMA are present in the (co)polymer in an amount from about 0.5 to about 10 percent, from about 1 to about 7.5 percent, or from about 2 to about 5 percent by weight of the (co)polymer on a dry solids basis. In particular embodiments, the GMA is present in the (co)polymer in an amount from about 0.5 to about 40 percent, from about 10 to about 25 percent, or from about 15 to about 20 percent by weight of the (co)polymer on a dry solids basis.

In some embodiments, carboxyl-functional (meth)acrylic (co)polymers include poly-acid or poly-anhydride polymers. Examples of such polymers include, but are not limited to, (co)polymers prepared from ethylenically unsaturated acid or anhydride monomers (e.g., carboxylic acid or carboxylic anhydride monomers) and other ethylenically unsaturated co-monomers (e.g., vinyl-functional co-monomers, particularly (meth)acrylic co-monomers).

A variety of carboxyl-functional and anhydride-functional monomers may be used; their selection is dependent on the desired final carboxyl-functional (meth)acrylic (co)polymer properties. In some embodiments, ethylenically unsaturated carboxyl-functional monomers and anhydride-functional monomers include monomers having a reactive carbon-carbon double bond and an acidic or anhydride group. In certain embodiments, such monomers have from 3 to 20 carbons, 1 to 4 sites of unsaturation, and from 1 to 5 acid or anhydride groups or salts thereof. In particular embodiments, the carboxyl-functional monomers are methacrylic acid and/or acrylic acid.

Monomer Variants.

Polyacrylates used according to the disclosure may include hydroxyl-functional (meth)acrylic (co)polymers, such as are obtained by polymerizing a hydroxyl-functional, ethylenically unsaturated monomer with other ethylenically unsaturated co-monomers (e.g., vinyl-functional co-monomers, particularly (meth)acrylic co-monomers). In certain embodiments, the hydroxyl-functional monomers have from 3 to 20 carbons, 1 to 4 sites of unsaturation, and from 1 to 5 hydroxyl groups. Specific examples of monomers containing a hydroxyl group are the hydroxy ($C_1$-$C_6$) alkyl (meth)acrylates such as, for example, 2-hydroxyethyl methacrylate, 2-hydroxyethyl acrylate, 2-hydroxypropyl methacrylate, and 3-hydroxypropyl methacrylate.

Polymerization Initiators.

A catalyst or initiator may be used in suitable amounts for polymerization of acrylate monomers. Suitable examples include free radical initiators that are sufficiently soluble in the co-monomer mixture and optional carrier liquid, and that decompose to form radicals when heated to a particular temperature. Non-limiting illustrative examples include azo-alkanes, peroxides, t-butyl perbenzoate, t-butyl peroxypivalate, and t-butyl peroxyisobutyrate. In particular embodiments, the initiators include azobis-isobutyronitrile (Trigonox B, Atofina Chemical Co.) and/or benzoyl peroxide. Further examples include but are not limited to water-soluble and water-insoluble species including: persulfates, such as ammonium or alkali metal (potassium, sodium or lithium) persulfate; azo compounds such as 2,2'-azo-bis (isobutyronitrile), 2,2'-azo-bis(2,4-dimethylvaleronitrile), and 1-t-butyl-azocyanocyclohexane; hydroperoxides such as t-butyl hydroperoxide, hydrogen peroxide, t-amyl hydroperoxide, methyl hydroperoxide, and cumene hydroperoxide; peroxides such as benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivalate; peresters such as t-butyl peracetate, t-butyl perphthalate, and t-butyl perbenzoate; as well as percarbonates, such as di(1-cyano-1-methylethyl)peroxy dicarbonate; perphosphates, and the like; and combinations thereof.

Such initiators may be used alone or as the oxidizing component of a redox system, e.g., in combination with a reducing component such as ascorbic acid, malic acid, glycolic acid, oxalic acid, lactic acid, thioglycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate, and combinations thereof. The reducing component is frequently referred to as an accelerator or a catalyst activator.

The initiator and accelerator may be used in proportion from about 0.001% to about 5% each, based on the weight of monomers to be copolymerized. Promoters such as chloride and sulfate salts of cobalt, iron, nickel or copper may be used in small amounts, if desired. Examples of redox catalyst systems include, but are not limited to, t-butyl hydroperoxide/sodium formaldehyde sulfoxylate/Fe(II) and ammonium persulfate/sodium bisulfate/sodium hydrosulfite/Fe(II).

Agents to Modulate Radical Propagation Rate and Chain Length.

When desired, chain transfer agents and other types of radical polymerization rate modulating agents may be used to control the radical chain reaction rate and also polymer molecular weight. Non-limiting illustrative examples include but are not limited to: viscosity-increasing agents such as fumed silica; monomers that react to form conjugation-stabilized radicals such as anthracene and divinyl benzene; monomers that react to form captodatively-stabilized radicals such as 1-methoxy-1-dimethylsulfonium-ethene; chain transfer agents such as organic thiols, diiodine, and such as copper halides with alkyl halides and N,N,N', N,N pentamethyldiethylenetriamine; chain transfer catalysts such as salts of Cr(I), Mo(III), Fe(I), V(0), Ti(III) and Co(II); reversible addition-fragmentation chain transfer agents such as thiocarbonylthio compounds, such as dithioesters, thiocarbamates, and xanthates; living group transfer polymerization agents such as silyl ketene acetals optionally catalyzed by a bifluoride or bioxyanion such as tris (dialkylamino)sulfonium bifluoride or tetrabutyl ammonium bibenzoate; polymerization-mediating iniferters such as dithiocarbamate, and polymerization-mediating stable free radicals such as nitroxides. In some embodiments, the compositions may also include one or more chain transfer agents selected from the group consisting of polyol, polyamine, linear or branched polyglycol ether, polyester and polylactone.

F. Polysiloxanes

Reactive Species for Polysiloxanes.

The compositions may include siloxanes, including but not limited to methyl-silanes, linear alkyl-silanes, branched alkyl-silanes, aromatic-silanes, fluorinated alkyl silanes, and dialkyl-silanes. Particular illustrative examples of organosilanes include, but are not limited to, ethyltrimethoxysilane, propyltrimethoxysilane, n-butyltrimethoxysilane, n-butyltriethoxysilane, pentyltriethoxysilane, phenyltriethoxysilane, isobutyltriethoxysilane, cyclopentyltrimethoxysilane, nonafluorohexyltris(dimethylamino)silane, and combinations thereof.

The reaction media may include various siloxanes designated here as si($R^1$)($R^2$)($R^3$)($R^4$). In some embodiments the reaction media may include chain-terminating siloxanes, wherein $R^1$, $R^2$ and $R^3$ are independently, partially independently or identically selected from the group consisting of alkyl, aryl, arylalkyl and alkyaryl, and $R^4$ is selected from the group consisting of H, halide, alkoxy, aryloxy, arylalkoxy and alkylaryloxy. In certain embodiments the compositions include linear chain-forming siloxanes, wherein $R^1$ and $R^2$ are independently, partially independently or identically selected from the group consisting of alkyl, aryl, arylalkyl and alkyaryl, and $R^3$ and $R^4$ are independently, partially independently or identically selected from the group consisting of H, halide, alkoxy, aryloxy, arylalkoxy and alkylaryloxy. In further embodiments the compositions include trivalent node-forming siloxanes, wherein $R^1$ is selected from the group consisting of alkyl, aryl, arylalkyl and alkyaryl, and $R^2$, $R^3$ and $R^4$ are independently, partially independently or identically selected from the group consisting of H, halide, alkoxy, aryloxy, arylalkoxy and alkylaryloxy. In particular embodiments the composition include tetravalent node-forming siloxanes wherein $R^1$, $R^2$, $R^3$ and $R^4$ are independently, partially independently or identically selected from the group consisting of H, halide, alkoxy, aryloxy, arylalkoxy and alkylaryloxy.

Catalysts for Polysiloxanes.

The compositions may optionally include catalysts for polysiloxane formation, as illustrated by the following non-limiting examples. Iodine may be used as a polymerization catalyst for silazanes and siloxanes, as taught by U.S. Pat. No. 3,355,475. Phosphazene base catalysts may be used for ring-opening polymerization, as taught by P. C. Hupfield and R. G. Taylor, *J. Inorg. Organomet. Polymers*, (1999), 9(1): 17-34. Silver nanoparticles capped by polyvinylpyrrolidone may be use to catalyze polymerization of alkysilanes to polysiloxanes, as taught by Q. Wei et al., *J. Mater. Chem.*, 2006, 16, 3606-3608. Gold nanoparticles may be used for polymerization of alkylsilanes such as $C_{18}H_{35}SiH_3$ and comparable compounds, as taught by B. L. Prasad et al. in *J. Am. Chem. Soc.*, 2003, 125(35):10488-9.

G. Hybrid Monomers and Resins

To facilitate cross-linking in some embodiments the intimate mixture comprises monomers that have a combination of two or more functional groups selected from siloxane-type, acrylic-type and cyclic alkylene oxide type.

Examples of suitable oxirane-functional (meth)acrylic (co)polymers include, but are not limited to, acrylate, methacrylate, and/or vinyl polymers and copolymers having oxirane functional groups (including, e.g., (meth)acrylate copolymers having pendant glycidyl groups). In one embodiment, the oxirane-functional (meth)acrylic (co)polymer is formed by reacting one or more oxirane-functional monomers, optional hydroxy-functional monomers, and one or more other monomers (e.g., non-functional monomers). In certain embodiments, oxirane-functional (meth)acrylic (co)polymers include those prepared by conventional free radical polymerization of from about 0.5 to about 40, from about 10 to about 25, or from about 15 to about 20 percent by weight of the unsaturated oxirane-functional monomer with the balance other ethylenically unsaturated co-monomers. In some embodiments, the oxirane-functional monomers containing a glycidyl group are glycidyl (meth)acrylate (i.e., glycidyl methacrylate and glycidyl acrylate), mono- and di-glycidyl itaconate, mono- and di-glycidyl maleate, and mono- and di-glycidyl formate.

In certain embodiments epoxides or siloxanes may be bonded to an ethylenically unsaturated group other than an acrylic type but capable of free radical initiated polymerization in aqueous medium. A non-limiting illustrative example of such an ethyleneically unsaturated monomer is a vinyl group. In some embodiments, the monomer mixture contains at least one oxirane-functional monomer containing an α,β-ethylenically unsaturated monomer.

Additional suitable oxirane-functional monomers having a reactive carbon-carbon double bond and an oxirane (i.e., a glycidyl) group include the following. In some embodiments, the monomer is a glycidyl ester of an α,β-unsaturated acid, or anhydride thereof (i.e., an oxirane group-containing α,β-ethylenically unsaturated monomer). Suitable α,β-unsaturated acids include, but are not limited to, monocarboxylic acids or dicarboxylic acids. Examples of such carboxylic acids include, but are not limited to, acrylic acid, methacrylic acid, α-chloroacrylic acid, α-cyanoacrylic acid, β-methylacrylic acid (crotonic acid), α-phenylacrylic acid, β-acryloxypropionic acid, sorbic acid, α-chlorosorbic acid, angelic acid, cinnamic acid, p-chlorocinnamic acid, β-stearylacrylic acid, itaconic acid, citraconic acid, mesaconic acid, glutaconic acid, aconitic acid, maleic acid, fumaric acid, tricarboxyethylene, maleic anhydride, and mixtures thereof.

Examples of suitable monomers containing a glycidyl group include, but are not limited to, glycidyl(meth)acrylate (i.e., glycidyl methacrylate and glycidyl acrylate), mono- and di-glycidyl itaconate, mono- and di-glycidyl maleate, and mono- and di-glycidyl formate, allyl glycidyl ether, and vinyl glycidyl ether. In particular embodiments, the monomer is glycidyl methacrylate ("GMA").

Oxirane-functional monomers may also be reacted with suitable other monomers within the monomer mixture. These may be ethylenically unsaturated monomers and hydroxy-functional monomers. Suitable ethylenically unsaturated monomers may include, but are not limited to, alkyl(meth)acrylates, vinyl monomers, alkyl esters of maleic or fumaric acid.

H. Cross-Linker Components (Condensation Type)

Coating compositions according to the present disclosure may also contain a cross-linker in an amount from about 0.1% to about 10%, from about 1% to about 5%, or from about 2% to about 4% by weight of the coating composition on a non-volatile solids basis (i.e., excluding optional solvents or carrier liquids). In some embodiments, the cross-linker includes two or more functional groups capable of undergoing chemical reaction with one or more of the hydroxyl-functional polyester resin, the phenol-formaldehyde resin, the carboxyl-functional polyester resin and and/or the optional cresol-formaldehyde resin.

Cross-linkers according to the disclosure may be employed to form bonds between chains of the same type of polymer (e.g., between two polyepoxide chains) and optionally to form bonds between chains of different types of polymers (e.g., between a polyacrylic chain and a siloxane chain), or for any combination. Thus the cross-reactivity with different polymer categories is a consideration when selecting cross-linkers.

The choice of cross-linkers also depends on the nature of the desired product. For example, some coating compositions are highly colored (e.g., gold-colored coatings) or are located on the interior of an opaque container. There coating cross-linkers may be yellowish in color. In contrast, generally only non-yellowing cross-linkers are employed in white or clear coatings, or only a small amount of yellowing cross-linker is used. Preferred cross-linkers are substantially free of mobile BPA, BPF, BADGE, and BFDGE.

Examples of suitable condensation-type cross-linking resins include, without limitation, methylated and butylated melamines, alkylated and imino mixed ether melamines, alkylated ureas, formaldehyde-free modified ureas, benzoguanamine, glycoluril, and the like.

The cross-linker may be any suitable compound including, for example, a single molecule, a dimer, an oligomer, a polymer, or a mixture thereof. In some embodiments, the cross-linker is a polymeric material or a polymer. Any suitable amino-, hydroxyl-, vinyl- or isocyanate-functional cross-linkable polymers may be used. For example, aminoplast and phenoplast (i.e. phenolic) cross-linkable polymers, containing two or more active hydrogen (e.g., amino or hydroxyl) groups may be used.

Examples of cross-linkable aminoplast polymers include, but are not limited to, the condensation products of aldehydes such as formaldehyde, acetaldehyde, crotonaldehyde, and benzaldehyde with amino- or amido-group-containing substances such as urea, melamine and benzoguanamine Examples of suitable cross-linking aminoplast polymers include, but are not limited to, polymers containing two or more amino functional groups. In some embodiments, suitable aminoplast polymer cross-linkers are commercially available, and may include benzoguanamine-formaldehyde polymers, melamine-formaldehyde polymers, esterified melamine-formaldehyde polymers, and urea-formaldehyde polymers. In an embodiment, the aminoplast cross-linkers can be melamine based, urea based, or benzoguanamine based. Melamine cross-linkers are commercially available, such as from Cytec Industries, Inc. (Woodland Park, N.J.) as CYMEL 303, 1130, 325, 327, and 370. In other embodiments, phenolic cross-linkers are used and include, for example, novolacs, and resoles. In certain embodiments, Bisphenol A can also be used as a cross-linker, provided the final product is still "substantially free of BPA". For use on food cans, phenolic resoles that are not derived from Bisphenol A may be particularly suitable.

Examples of cross-linkable phenoplast (co)polymers include, but are not limited to, the condensation products of aldehydes with phenols. In some embodiments, the aldehydes are formaldehyde and/or acetaldehyde. Various phenols may be used, including but not limited to phenol, cresol, p-phenylphenol, p-tert-butylphenol, p-tert-amylphenol, and cyclopentylphenol. Examples of suitable cross-linking phenoplast (i.e., phenolic) (co)polymers include, but are not limited to, (co)polymers containing two or more hydroxyl functional groups that may be substantially free of mobile BPA, BPF, BADGE, and BFDGE.

In addition to the functional polyester resin and the cross-linker, the coating composition may also include a phenolic resin. In some embodiments, the phenolic resin is present in the composition in an amount from about 0.5% to about 10% or from about 1% to about 5% by weight of the coating composition on a non-volatile solids basis. The choice of particular phenolic resin typically depends on the particular product being formulated. For example, some coating compositions are highly colored (e.g., gold-colored coatings). These coatings may typically be formulated using phenol-formaldehyde resins that tend to have a red or yellowish color. In contrast, white or clear coatings are generally formulated using non-yellowing resole-formaldehyde resins, or only a small amount of a yellowing resin. Preferred phenol-formaldehyde resins are substantially free of mobile BPA, BPF, BADGE, and BFDGE.

In some embodiments, the phenol-formaldehyde resin is a polymeric material. In certain embodiments, the phenol-formaldehyde resin is a (co)polymer. In particular embodiments, the phenol-formaldehyde resin contains at least two hydroxyl groups capable of undergoing chemical reaction with at least one or more of the functional polyester resin and/or the cross-linker, thereby effecting cross-linking within the coating composition upon curing.

In some embodiments, phenolic cross-linkers of the resole type may be used such as, for example, phenol, butylphenol, xylenol- and cresol-formaldehyde types. In certain embodiments, phenolic cross-linkers that are etherified with butanol being are used for protective container coatings [see, for example, Zeno Wicks, Jr., Frank N. Jones and S. Peter Pappas, Organic Coatings: Science and Technology, Vol. 1, pp. 184-186 (John Wiley & Sons: New York, 1992)].

In some embodiments, commercially available phenolic cross-linkers are used. Examples of commercially available phenolic cross-linkers include, but are not limited to, those known by the tradenames DUREZ™ and VARCUM™ from DUREZ Corp. (Dallas, Tex.) or Reichhold Chemical AG (Austria); (CO)POLYMEROX™ from Monsanto Chemical Co. (St. Louis, Mo.); AROFENE™ and AROTAP™ from Ashland Chemical Co. (Dublin, Ohio); and BAKELITE™ from Bakelite A.G. (Iserlohn, Germany). In some embodiments, resole phenolic cross-linkers are BAKELITE PF 6470 LB™, BAKELITE 9989LB™, and/or VARCUM 2227 B 55™. In additional embodiments, one of the two BAKELITE™ phenolic resins are used as a mixture in the undercoat coating composition with VARCUM 2227 B 55, generally at a weight ratio of between 1/3 to 3/1 of BAKELITE™ to VARCUM™ phenolic cross-linker.

In certain embodiments, the cross-linker is selected to be a blocked isocyanate having two or more isocyanate functional groups, or an isocyanate group and a vinyl group, capable of cross-linking with at least one component of the coating composition. In some embodiments, the blocked isocyanate is an aliphatic and/or cycloaliphatic blocked polyisocyanate such as, for example, HDI (hexamethylene diisocyanate), IPDI (isophorone diisocyanate), HMDI (bis [4-isocyanatocyclohexyl]methane), TMXDI (tetramethylene-m-xylidene diisocyanate), M-TMI (isopropenyldimethyl-benzylisocyanate), dimers or trimers thereof, and combinations thereof. In certain embodiments the blocking agents include, for example, n-butanone oxime, ε-caprolactam, diethyl malonate, and/or secondary amines.

In some embodiments, commercially available blocked isocyanate cross-linkers are used and include, for example, VESTANAT™ B 1358 A, VESTANAT™ EP B 1186 A, VESTANAT™ EP B 1299 SV (all available from Degussa Corp., Marl, Germany) and DESMODUR™ BL 3175 (available from Bayer A.G., Leverkusen, Germany).

Acid and Anhydride Salts as Cross-Linkers.

A salt (which can be a full salt or partial salt) of the acid- or anhydride-functional polymer may be formed by neutralizing or partially neutralizing the acid groups (whether present initially in the acid-functional polymer or formed upon addition of the anhydride-functional polymer to water) of the polymer with a suitable base such as, for example, an amine such as a tertiary amine. Some examples of suitable tertiary amines include, but are not limited to, trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. In some embodiments, triethyl amine or dimethyl ethanol amine is used as the tertiary amine.

The degree of neutralization used to form the desired polymer salt may vary considerably depending upon the amount of acid included in the polymer, and the degree of solubility or dispersibility of the salt which is desired. Ordinarily in making the polymer water-dispersible, the acidity of the polymer is at least about 25% neutralized, at least about 30% neutralized, or at least about 35% neutralized, with the amine in water. When using anionic salt-forming groups other than acid or anhydride groups or cationic salt-forming groups, the degree of neutralization may be pursuant to those described above. In some embodiments, the polymer of the aqueous dispersion includes a sufficient number of water-dispersing groups to form a stable aqueous dispersion.

As previously discussed, any suitable salt-forming or water-dispersing group may be used in place of, or in addition to, acid or anhydride groups. For further discussion of such groups, see, for example, U.S. Pat. No. 4,147,679. Some further examples of anionic salt groups include sulphate groups, phosphate groups, sulfonate groups, phosphinate groups, phosphonate groups, and combinations thereof. Some examples of suitable cationic salt groups include, but are not limited to, quaternary ammonium groups, quaternary phosphonium groups, tertiary sulfate groups, and combinations thereof. Some examples of non-ionic water-dispersing groups include, but are not limited to, hydrophilic groups such as ethylene oxide groups. Compounds for introducing the aforementioned groups into polymers are known in the art. Some additional examples of neutralizing bases for forming anionic salt groups include, but are not limited to, inorganic and organic bases such as sodium hydroxide, potassium hydroxide, lithium hydroxide, ammonium hydroxide, and mixtures thereof. Some examples of neutralizing compounds for forming cationic salt groups include, but are not limited to, organic and inorganic acids such as formic acid, acetic acid, hydrochloric acid, sulfuric acid, and combinations thereof.

In some embodiments, the amount of the salt of the acid-functional or anhydride-functional polymer that is used in the polymerization is at least about 5%, at least about 10%, or at least 15% by weight. In some embodiments, the amount of the salt of the acid-functional or anhydride-functional polymer that is used in the polymerization is no greater than about 95%, no greater than about 50%, or no greater than about 40% by weight. These percentages are based on total weight of polymerizable ethylenically unsaturated monomer component and the salt of the acid group-containing polymer. In embodiments where the polymer includes water-dispersing groups other than neutralized acid- or anhydride-groups, the total amount of the polymer used in the polymerization will typically fall within the above parameters, with the above percentages based on based on total weight of ethylenically unsaturated monomer component and water-dispersible polymers.

The reaction of tertiary amines with materials containing oxirane groups, when carried out in the presence of water, may afford a product that contains both a hydroxyl group and a quaternary ammonium hydroxide. In some embodiments, an acid group, an oxirane group, and an amine form a quaternary salt. It should be noted that an acid group and an oxirane group may also form an ester. Some of this reaction is possible, though this linkage is less desirable when water dispersibility is sought.

Hydroxy-Functional Components.

As noted above polyols may be used for the creation of epoxy resins; however they may also be used for cross-linking—e.g., with siloxanes, acrylic polymers or epoxies. In some embodiments, the compositions may include additional components, such as a hydroxy-functional or an amine functional component and additive. In particular embodiments, the hydroxy-functional component lacks curable groups (e.g., acrylate-, epoxy-, or oxetane groups).

In some embodiments, the compositions include one or more hydroxy-functional components. Hydroxy-functional components may be helpful in further tailoring mechanical properties of the binder formulation upon cure. In certain embodiments, the hydroxy-functional component includes, but is not limited to, a monol (a hydroxy-functional component comprising one hydroxy group) or a polyol (a hydroxy-functional component comprising more than one hydroxy group).

Examples of hydroxy-functional components include, but are not limited to, an alkanol, a monoalkyl ether of polyoxyalkyleneglycol, a monoalkyl ether of alkyleneglycol, alkylene and arylalkylene glycol, such as 1,2,4-butanetriol, 1,2,6-hexanetriol, 1,2,3-heptanetriol, 2,6-dimethyl-1,2,6-hexanetriol, (2R,3R)-(−)-2-benzyloxy-1,3,4-butanetriol, 1,2,3-hexanetriol, 1,2,3-butanetriol, 3-methyl-1,3,5-pentanetriol, 1,2,3-cyclohexanetriol, 1,3,5-cyclohexanetriol, 3,7,11,15-tetramethyl-1,2,3-hexadecanetriol, 2-hydroxymethyl-tetrahydropyran-3,4,5-triol, 2,2,4,4-tetramethyl-1,3-cyclobutanediol, 1,3-cyclopentanediol, trans-1,2-cyclooctanediol, 1,16-hexadecanediol, 3,6-dithia-1,8-octanediol, 2-butyne-1,4-diol, 1,2- or 1,3-propanediol, 1,2- or 1,4-butanediol, 1,5-pentanediol, 1,6-hexanediol, 1,7-heptanediol, 1,8-octanediol, 1,9-nonanediol, 1-phenyl-1,2-ethanediol, 1,2-cyclohexanediol, 1,5-decalindiol, 2,5-dimethyl-3-hexyne-2,5-diol, 2,2,4-trimethylpentane-1,3-diol, neopentylglycol, 2-ethyl-1,3-hexanediol, 2,7-dimethyl-3,5-octadiyne-2-7-diol, 2,3-butanediol, 1,4-cyclohexanedimethanol, polyoxyethylene or polyoxypropylene glycols or triols of molecular weights from about 200 to about 10,000, polytetramethylene glycols of varying molecular weight, poly(oxyethylene-oxybutylene) random or block copolymers, copolymers containing pendant hydroxy groups formed by hydrolysis or partial hydrolysis of vinyl acetate copolymers, polyvinylacetal resins containing pendant hydroxyl groups, hydroxy-functional (e.g., hydroxy-terminated) polyesters or hydroxy-functional (e.g., hydroxy-terminated) polylactones, aliphatic polycarbonate polyols (e.g., an aliphatic polycarbonate diol), hydroxy-functional (e.g., hydroxy-terminated) polyethers (e.g., polytetrahydrofuran polyols having a number average molecular weight in the range of 150-4000 g/mol, 150-1500 g/mol, or 150-750 g/mol), or a combination thereof. An exemplary polyol further includes aliphatic polyol, such as glycerol, trimethylolpropane, or also sugar alcohol, such as erythritol, xylitol, mannitol or sorbitol. In particular embodiments, an external phase or outer layer of a binder formulation includes one or more alicyclic polyols, such as 1,4-cyclohexanedimethanol, sucrose, or 4,8-bis(hydroxymethyl)tricyclo(5,2,1,0)decane.

In some embodiments, the composition includes a linear or branched polyglycol ether obtainable by ring-opening polymerization of cyclic ether in the presence of polyol, e.g., the aforementioned polyol; polyglycol ether, polyethylene glycol, polypropylene glycol or polytetramethylene glycol, or a copolymer thereof.

I. Other Polymers

Polymers may be included in the compositions, having other than cyclic ether, acrylic or siloxane functionalities, and may be present initially as polymers or may be generated during curing of the intimate mixture. These may be particularly useful as cross-linking agents (for instance polyamines with epoxy resins), as plasticizers (for instance polyalkylene oxides), and as agents having high transparency (e.g., polyesters). In some embodiments, the polymer may be terminated at each end with a functional group. One skilled in the art understands that typical polyester terminal groups (e.g., hydroxyl or carboxyl groups) may be chemically reacted or exchanged to produce terminal amino-functional, amido-functional, or urea-polyester polymers using conventional chemical synthesis methods known in the art.

In some embodiments, the functional groups are chemically identical and are selected to be terminal hydroxyl or terminal carboxyl groups. The functional groups of the polymer may be selected to be hydroxyl groups. The polymer may be selected to exhibit a hydroxyl number from about one to about 40 mg KOH per gram of polymer on a non-volatile solids basis.

In certain embodiments, the polymer having other functional groups is a macromolecule exhibiting a number average molecular weight ($M_n$) from about 500 to about 10,000 Daltons (Da), from about 1,000 to about 7,500 Da, or from about 3,000 to about 5,000 Da. The polymer may exhibit a glass transition temperature ($T_g$) greater than about 50° C., greater than about 60° C., less than about 100° C., or less than about 90° C. In other embodiments, the polymer may exhibit a glass transition temperature in a range from about 50° C. to about 100° C., about 60° C. to about 90° C., or about 50° C. to about 60° C.

Where the polymers having other functional groups are polyesters they are typically prepared by condensation (esterification) according to known processes [see, for example, Zeno Wicks, Jr., Frank N. Jones and S. Peter Pappas, Organic Coatings: Science and Technology, Vol. 1, pp. 122-132 (John Wiley & Sons: New York, 1992)]. The polymer is usually derived from a mixture of at least one poly-functional alcohol (polyol) (generally a dihydroxy or trihydroxy alcohol) esterified with excess equivalents of a mixture of at least one dicarboxylic acid or anhydride (generally an aromatic dicarboxylic acid or anhydride).

In some embodiments, functional polyester resins are prepared from an aromatic or aliphatic polycarboxylic acid or anhydride, and an aromatic or aliphatic diol, triol, or polyol. In embodiments, the diol, polycarboxylic acid and/or anhydride are combined in correct proportions and reacted using standard esterification (condensation) procedures to provide a polyester having functional groups at the terminal ends of the polyester resin. In certain embodiments, the functional groups at the terminal ends of the polyester resin are hydroxyl groups. Hydroxyl groups may be positioned at the terminal end of the polyester by using excess diol, triol, or polyol in the esterification reaction. In certain embodiments, a triol or polyol is used to provide a branched, as opposed to a linear, polyester.

Polycarboxylic Acids and Anhydrides.

Examples of suitable polycarboxylic acids or anhydrides may have saturated or unsaturated alkyl groups and include, but are not limited to, maleic anhydride, maleic acid, fumaric acid, succinic anhydride, succinic acid, adipic acid, phthalic acid, phthalic anhydride, 5-tert-butyl isophthalic acid, tetrahydrophthalic anhydride, hexahydrophthalic anhydride, endomethylenetetrahydrophthalic anhydride, azelaic acid, sebacic acid, tetrachloro-phthalic anhydride, chlorendic acid, isophthalic acid, trimellitic anhydride, terephthalic acid, a naphthalene dicarboxylic acid, cyclohexane-dicarboxylic acid, glutaric acid, anhydrides and acids thereof, and mixtures thereof. It is also understood that an esterifiable derivative of a polycarboxylic acid, such as a dimethyl ester or anhydride of a polycarboxylic acid, can be used to prepare the polyester.

Dicarboxylic acids and their esterifiable derivatives may be used. Examples of such compounds include, but are not limited to, phthalic acid, isophthalic acid, terephthalic acid, 1,4-cyclohexanedicarboxylic acid, succinic acid, sebacic acid, methyltetrahydrophthalic acid, methylhexahydrophthalic acid, tetrahydrophthalic acid, dodecanedioic acid, adipic acid, azelaic acid, naphthalenedicarboxylic acid, pyromellitic acid and/or dimer fatty acids, acid anhydrides thereof and/or lower alkyl esters, for example methyl esters. Tri-carboxylic acids (e.g. trimellitic acid) may also be used.

In some embodiments, polycarboxylic acids and their esterifiable derivatives contain aromatic functionality. Examples of aromatic dicarboxylic acids include, but are not limited to, phthalic acid, terephthalic acid, isophthalic acid, and dimer fatty acid. In some embodiments, trimellitic acid is the aromatic tricarboxylic acid. Other embodiments use terephthalic and isophthalic acid. The anhydride derivatives of these acids may also be used if they exist as anhydrides.

In certain embodiments, less than 10% by weight of the dicarboxylic acid content comprises other aliphatic polyfunctional carboxylic acids. Examples of other aliphatic polyfunctional carboxylic acids include, but are not limited to, malonic acid, succinic acid, glutaric acid, adipic acid, azelaic acid, suberic acid, sebacic acid, dimer fatty acids, maleic acid, and dimer fatty acids. Hydroxy acids may also be included in the polyester such as, for example, 12-hydroxy stearic acid, lactic acid, and 2-hydroxy butanoic acid. In some embodiments, acid- or anhydride-functional polymers are used and have one or more segments of Formula I:

—O—Ar—$R_n$—C(O)O—$R^1$—O—C(O)—$R_n$—Ar—O— wherein each Ar is independently a divalent aryl group (i.e., an arylene group) or heteroarylene group; $R^1$ is a divalent organic group; each R is independently a divalent organic group; and n is 0 or 1. Any one polymer may have a variety of such segments, which may be the same or different.

In particular embodiments, $R^1$ provides hydrolytic stability to at least one of the adjacent ester linkages (—C(O)—O— and —O—C(O)—), and preferably to both of them. In this context, "hydrolytic stability" means that $R^1$ decreases the reactivity (preferably, by at least half) of the adjacent ester linkage with water compared to a —$CH_2$—$CH_2$— moiety under the same conditions. This may be accomplished by selection of $R^1$ that includes a sterically bulky group in proximity (preferably within two atoms distance) to the oxygen of the ester. In some embodiments, the polymer includes more than about 70%, more than about 80%, or more than about 90% hydrolytically stable ester linkages (based on the total number of ester linkages).

In the segments of Formula I, $R^1$ may be a divalent organic group having at least 3 carbon atoms, at least 4 carbon atoms, at least 5 carbon atoms, or at least 8 carbon atoms.

In certain embodiments of Formula I, $R^1$ is of the formula —C($R^2$)$_2$—$Y_t$—C($R^2$)$_2$— wherein each $R^2$ is independently hydrogen or an organic group (e.g., an alicyclic group or a branched or unbranched alkyl group), Y is a divalent organic group, and t is 0 or 1. In certain embodiments, each $R^2$ is independently hydrogen.

In certain embodiments, Y can optionally include one or more ether or ester linkages. In certain embodiments, Y is a divalent saturated aliphatic group (i.e., a branched or unbranched alkylene group), a divalent alicyclic group, or a divalent aromatic group (i.e., an arylene group), or combinations thereof.

In certain embodiments, Y is a divalent alkyl group (i.e., an alkylene group), which can be branched or unbranched, and has at least 1 carbon atom, at least 2 carbon atoms, at least 3 carbon atoms, or at least 6 carbon atoms. In certain embodiments, Y is a divalent alicylic group. In particular embodiments, Y is cyclohexylene.

In certain embodiments, $R^1$ has the formula —(C($R^2$)$_2$)$_s$— wherein s is at least 2 or at least 3, and wherein each $R^2$ is as defined above. Examples of such $R^1$ groups include, for example, neopentylene, butylethylpropylene, and —$CH_2$—CH($CH_3$)$CH_2$—.

In certain embodiments, Y has the formula —[$Z_w$—C($R^2$)$_2$—O—C(O)—$R^3$—C(O)—O—C($R^2$)$_2$—]$_v Z_w$—, wherein w is 0 or 1, v is 1 to 10, each $R^2$ is as defined above, each $R^3$ is independently a divalent organic group, and each Z is independently a divalent organic group.

In certain embodiments, $R^3$ is a divalent saturated aliphatic group (i.e., branched or unbranched alkylene group), a divalent alicyclic group, an arylene group, or combinations thereof. In certain embodiments, $R^3$ is a ($C_3$-$C_{20}$)alkylene (branched or unbranched) group or a phenylene group.

In certain embodiments, Z is a divalent saturated aliphatic group (i.e., branched or unbranched alkylene group), a divalent alicyclic group, a divalent aromatic group (i.e., an arylene group), or combinations thereof.

In some embodiments, in the segments of Formula I, n is 0 (i.e., R is not present). If n is 1 and R is present, however, it is a ($C_1$-$C_4$)alkylene group or a ($C_1$-$C_4$)alkylene moiety.

In some embodiments, in the segments of Formula I, each Ar has less than about 20 carbon atoms, less than about 11 carbon atoms, or less than about 8 carbon atoms. In particular embodiments, Ar has at least 4 carbon atoms, at least 5 carbon atoms, or at least 6 carbon atoms.

In certain embodiments, each Ar is a phenylene group. In certain embodiments, each Ar is a phenylene group of the formula —$C_6(R^4)_4$—, wherein each $R^4$ is independently hydrogen, a halogen, or an organic group, and wherein two $R^4$ groups can join to form a ring optionally containing one or more heteroatoms. In certain embodiments, $R^4$ is hydrogen or an organic group, wherein two $R^4$ groups can join to form a 6-membered ring. In some embodiments, $R^4$ is hydrogen.

Polyester polymers such as these can be made by a variety of methods from compounds of Formula II: HO—Ar—$R_n$—C(O)O—$R^1$O—C(O)$R_n$—Ar—OH wherein Ar, R, $R^1$, and n are as defined above. Such compounds may be made, for example, by the esterification reaction of one mole of a diol (e.g., HO—$R^1$—OH such as, for example, 1,4-cyclohexane dimethanol, neopentyl glycol, 2-butyl-2-ethyl-1,3-propane diol, or 2-methyl-1,3-propane diol) with two moles of an acid (e.g., 4-hydroxy benzoic acid). Alternatively, such compounds may be made, for example, by the transesterification reaction of one mole of a diol (e.g., 1,4-cyclohexane dimethanol, neopentyl glycol, 2-butyl-2-ethyl-1,3-propane diol, or 2-methyl-1,3-propane diol) with two moles of an ester (e.g., 4-hydroxy methyl benzoate, 4-hydroxy ethyl benzoate, or 4-hydroxy butyl benzoate).

The polymer may be carboxyl-terminated or hydroxy-terminated, depending upon the stoichiometry of the esterification reaction mixture. To provide a hydroxy-terminated polyester, the equivalent excess of polyol over dicarboxylic acid may be maintained from about 0.02 to about 0.784 or from about 0.04 to about 0.554 on a molar basis. Similarly, to provide a carboxyl-terminated polyester, a two-step process may be used. In certain embodiments, one prepares a hydroxy-polyester, and then reacts the terminal hydroxyl groups with a molar excess of dicarboxylic acid. The equivalent excess of dicarboxylic acid over polyol generally may be maintained from about 0.02 to about 0.784 or from about 0.04 to about 0.554 on a molar basis. A modest amount (e.g. 1-5 percent by weight) of a tri-functional monomer (e.g. trimellitic anhydride) may be added to increase the number average carboxyl-functionality of the polyester (co)polymer.

In some embodiments, the polymer is hydroxy-terminated. In some embodiments, the hydroxyl number of the hydroxy-polyester polymer ranges typically from about one to about 50 milligrams or from about one to about 20 mg KOH/g (co)polymer. In alternative embodiments—the polymer is carboxyl-terminated. The carboxyl-terminated polymers may exhibit an acid number (AN) of about one to about 50 mg or about one to 20 mg KOH/g (co)polymer. Acid number may be determined using the titrimetric method described in ISO Standard XP-000892989. Hydroxyl number may be determined using the same standard test method, substituting a solution of hydrochloric acid in ethanol for the potassium hydroxide in ethanol titrant, and expressing the neutralization endpoint equivalents of hydrochloric acid in terms of the molar equivalents of KOH.

Various commercially available functional polyester resins may be suitable for use in the present disclosure. For example, VITEL™ polyester (co)polymers (e.g., VITEL™ PE-100 and PE-200 saturated polyester resins available from Goodyear Tire & Rubber Co., Akron, Ohio), URALAC™ polyester resins (e.g., URALAC ZW5000SH™ available from DSM Resins U.S., Inc., Augusta, Ga.), and Dynapol™ polyester resins (e.g. Dynapol™ L and LH saturated polyester resins available from Degussa, Corp., Parsippany, N.J.).

J. Condensation Cure Acceleration Catalysts

Optionally, a catalyst may be used to increase the rate of cure or cross-linking in the compositions. In some embodiments, the catalyst is present in an amount of about 0.05 to about 5 percent or about 0.1 to about 1.5 percent by weight of nonvolatile material.

Examples of suitable catalysts, include, but are not limited to, quaternary ammonium compounds, phosphorus compounds, and tin and zinc compounds. More specifically, tetraalkyl ammonium halides, tetraalkyl or tetraaryl phosphonium iodide or acetate, tin octoate, zinc octoate, triphenylphosphine, combinations thereof, and similar catalysts are known to be useful by persons skilled in the art. These are particularly effective when catalyzing (trans)esterification reactions.

In certain embodiments, the catalyst is, for example, a phosphoric acid solution (e.g., an 85% aqueous phosphoric acid solution in butyl glycol at a 1:1 weight ratio), a phosphoric acid ester solution (e.g., ADDITOL XK 406™, available from Cytec Surface Specialties, Inc., West Paterson, N.J.), and dodecylbenzene sulfonic acid (e.g. CYCAT 600™ available from Cytec Surface Specialties, Inc., West Paterson, N.J.). Additionally or alternatively, tin catalysts may be used. In particular embodiments, the tin catalyst is a mixture of mono- and di-octyl tin-mercaptides (e.g. TINSTAB OTS 17 MS™ available from AKZO-Nobel Chemicals, Inc., Chicago, Ill.) or dibutyltin dilaurate (e.g. FASCAT™ available from Atofina Chemicals, Inc., Philadelphia, Pa.).

In other embodiments, catalysts for accelerating the rate of cure for the compositions include, for example, aluminum catalysts (e.g., aluminum sec-butoxide, AKZO-Nobel Chemicals, Inc., Chicago, Ill.).

In particular embodiments, the catalysts; include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid). Illustrative concentration ranges include at least about 0.01% or at least about 0.1% by weight, based on the weight of nonvolatile material. If used, a catalyst may be present in an amount of no greater than about 3% or no greater than about 1% by weight, based on the weight of nonvolatile material.

K. Other Components

Solvents.

In some embodiments, the composition comprises a carrier liquid. In particular embodiments the carrier liquid is a volatile, substantially nonaqueous organic solvent or solvent blend so as to expedite evaporation and curing. Either before or after curing, a relatively low amount of water may be included, such as up to about five percent by total weight of the coating composition, without compromising anti-corrosion properties of the final over-coat. The water can be added to the composition intentionally, or may be introduced inadvertently such as when adding a component during coating formulation.

In certain embodiments, the composition comprises a substantially nonaqueous carrier liquid that is sufficiently volatile to evaporate essentially entirely during thermal curing such as at about 176° C. to about 205° C. for 8 to 12 minutes. Suitable non-limiting examples include, but are not limited to, aliphatic hydrocarbons (e g, mineral spirits, kerosene, high flashpoint VM&P naphtha, and the like); aromatic hydrocarbons (e.g., benzene, toluene, xylene, solvent naphtha 100, 150, 200, and the like); alcohols (e.g., ethanol, n-propanol, isopropanol, n-butanol, iso-butanol, and the like); ketones (e.g., acetone, 2-butanone, cyclohexanone, methyl aryl ketones, ethyl aryl ketones, methyl isoamyl ketones, and the like); esters (e.g., ethyl acetate, butyl acetate, and the like); glycols (e.g., butyl glycol); propylene glycol ethers (e.g., propylene glycol monomethyl ether, an ether of propylene glycol); ethylene glycol ethers (e.g., ethylene glycol monomethyl ether, ethylene glycol monoethyl ether, ethylene glycol monobutyl ether, and the like); glycol esters (e.g., butyl glycol acetate, methoxypropyl acetate, and the like); and mixtures thereof.

The amount of nonaqueous carrier included in the coating composition is limited by the desired, suitable, or preferred rheological properties for application to the substrate. A sufficient amount of nonaqueous carrier may be included in the composition to enable facile processing, easy and uniform application to a metal substrate and essentially complete removal in a short cure cycle.

Thus suitable criteria for the substantially nonaqueous carrier are: adequate dispersal and/or solubilizing of composition components; inertness toward other composition components; chemical stability; compatibility with adhesion and anti-corrosion effects; and rapid evaporation.

Lubricants.

Compositions may also comprise lubricants, that is, protective coatings for can interiors may include a natural or synthetic lubricant such as long-chain aliphatic waxes, carnuba waxes (e.g. Luba-Print 887/C Wax Dispersion available from L. P. Bader & Co., GmbH, Rottweil, Germany), synthetic wax dispersions (e.g. Lanco Glidd 4518V available from Lubrizol, Corp., Wickliffe, Ohio), poly(tetrafluoroethylene) waxes, and mixtures, blends or dispersions thereof.

Pigments.

In some embodiments, a pigment is added to the composition for the under-coat, the over-coat, or both. Suitable pigments, such as aluminum flake, titanium dioxide, and zinc oxide, may be added to improve the appearance of the protective coating, or to act as scavengers for hydrogen sulfide emitted by foodstuffs that otherwise stain or darken protective coatings. Aluminum flake may be present in either or both the under-coat and over-coat coating compositions at a concentration from about 2 to about 15 percent or from about 5 to about 10 percent by weight of the composition on a non-volatile solids basis. In another embodiment titanium dioxide is present in one or both compositions, in an amount from about 35 to about 50 percent or from about 40 to about 45 percent by weight of the coating composition. In a further embodiment zinc oxide is present in one or both compositions, in an amount from about 0.5 to about 30 percent or from about 5 to about 15 percent by weight of the composition. Miscellaneous Additives. Optionally, the compositions may include other additives such as water, coalescing solvents, leveling agents, surfactants, wetting agents, dispersants (e.g., lecithin), defoamers (e.g., modified (poly)siloxanes), thickening agents (e.g., methyl cellulose), cure accelerators, suspending agents, adhesion promoters, cross-linking agents, corrosion inhibitors, fillers (e.g., titanium dioxide, zinc oxide, and/or aluminum), matting agents (e.g., precipitated silica), impact modifiers and the like, and combinations thereof. In certain embodiments, the additives may include BYK-357 (available from BYK-Chemie, GmBH, Wesel, Germany) and POLYSLIP VS 86 (available from Rohm & Haas Corp., Philadelphia, Pa.).

A coating composition of the present disclosure may also include other optional polymers that do not adversely affect the coating composition or a cured coating composition resulting therefrom. Such optional polymers may be included in a coating composition as a filler material, although they may be included as a cross-linking material, or may provide desirable properties. One or more optional polymers (e.g., filler polymers) may be included in a sufficient amount to serve an intended purpose, but not in such an amount to adversely affect a coating composition or a cured coating composition resulting therefrom.

Such additional polymeric materials may be nonreactive, and hence, simply function as fillers. Such optional nonreactive filler polymers may include, for example, polyesters, acrylics, polyamides, polyethers, and novalacs. Alternatively, such additional polymeric materials or monomers may be reactive with other components of the composition (e.g., the acid-functional polymer). If desired, reactive polymers may be incorporated into the compositions of the present disclosure, to provide additional functionality for various purposes, including cross-linking. Examples of such reactive polymers include, for example, functionalized polyesters, acrylics, polyamides, and polyethers. In particular embodiments, the optional polymers are substantially free of mobile BPA and aromatic glycidyl ether compounds (e.g., BADGE, BFDGE and epoxy novalacs).

L. Fabrication Methods for Bonding to Metal Sheets

Protective coatings for fabricating food and beverage containers may be applied to metal substrates and cured into films, e.g., on high-speed coating lines (e.g., coil coating lines). The coating agents may be applied in a roller coating process either continuously on coil lines or batch-wise on sheet coating lines to thin metals such as aluminum, tinplate, tin free steel, or chromed steel, and then reacted at high temperatures. The coated metals thus produced may be shaped to form the desired metal packaging articles by processes such as, for example, drawing and ironing, draw-redraw, deep-drawing, stamping, creasing, die reducing, and flanging.

Suitable substrate metals include but are not limited to tinplate, tin free steel, aluminum and its alloys, and the like. The compositions may be applied as a film by conventional means such as, for example, brushing, roller coating, or spraying. In certain embodiments, roller coating is used to coat flat metal cans. In other embodiments, spraying is used to coat preformed cans.

In a particular sheet bake embodiment, large roll-coated metal sheets are placed upright in racks in ovens for about 10 minutes to achieve peak metal temperatures from about 180° C. to about 205° C. In another embodiment, large coil-coated rolls of thin gauge metal (e.g., steel or aluminum) are unwound, roll coated or sprayed, heat cured, and rewound; the total residence time in the curing ovens is in the range of about 2 to about 20 seconds, with peak metal temperatures of about 215° C. to about 300° C.

Coil coating refers to coating of a continuous coil composed of a metal (e.g., steel or aluminum) followed by rapid curing and drying by thermal, ultraviolet, and/or electromagnetic means. The coated coils are useful for fabricating into formed articles such as two-piece cans, three-piece cans, can ends, and the like.

Sheet coating refers to coating of separate pieces of a variety of materials (e.g., steel or aluminum) that have been pre-cut into square or rectangular 'sheets', often about one square meter in size. After drying and curing the sheets may be fabricated into formed articles such as two-piece cans, three-piece cans, can ends, drawn and ironed cans, and the like.

In one embodiment, the method of the present disclosure includes applying an under-coat coating composition onto a surface of a metal substrate to form a first coating layer, heating the coated substrate so that the first coating layer at least partially cures to form a cured film adhered to the substrate surface, applying an over-coat coating composition onto the first coating layer to form a second coating layer, and heating the coated substrate so that the second coating layer at least partially cures to form a cured film adhered to the first coating layer. The first and second coating layers may be applied in a single pass, in multiple passes, or in combination with additional coating layers placed between the metal substrate and the first coating layer (e.g., a priming or subbing layer) or on top of the second coating layer. In some embodiments the first and second coating layers are separated by one or more intermediate layers.

In certain embodiments, the coating compositions are roll coated onto metal substrates (e.g., by direct roll coating, reverse roll coating, rotogravure coating, or the like). In a non-limiting illustrative example, the coating compositions are roll coated to produce cured films having overall multi-coat film weights selected from a range of about 8 g/m$^2$ to about 28 g/m$^2$.

In some embodiments, the under-coat and over-coat compositions, after application to the metal substrate, are at least partially cured (i.e. hardened or cross-linked) by exposure to heat, actinic radiation (e.g., ultraviolet or infrared curing), electromagnetic radiation (e.g., electron beam curing), combinations thereof, and the like. In certain embodiments, the under-coat composition on the metal substrate is at least partially cross-linked before applying the over-coat.

The applied under-coat and over-coat compositions may be dried and cured by heating to evaporate at least a portion of any carrier liquids and/or to accelerate cross-linking. The coated composition may be heated to about 150-220° C. for 1 to 20 minutes to form a dried, cured film.

In some embodiments, the coating is applied by a sheet-bake process and the coated metal substrate is cured at a temperature of 175° C. to about 205° C. for 8 to 10 minutes. In alternative embodiments, the coating is coil-coated onto a metal substrate and cured by heating for about 2 to about 20 seconds at a temperature of about 230° C. to about 300° C.

M. Contact Angles

As most commonly measured, contact angles with water are measured by providing the material of interest as a horizontal plane with a flat and very clean upward surface, introducing a sessile drop of highly purified water to the surface, then allowing the drop to stand until still, and finally measuring the angle between the surface area that is immediately beneath the drop and the liquid/vapor interface that arises from the surface. i.e., the angle passes through the liquid. A given system of solid, liquid, and vapor at a given temperature and pressure has a unique equilibrium contact angle. The equilibrium contact angle reflects the relative importance of interactions between the liquid, solid and vapor. However, empirical measurements suffer from contact angle hysteresis, due to so-called advancing (maximal) contact angle and so-called receding (minimal) contact angle. The equilibrium contact is between those values, and can be calculated from them.

Where the surface attracts water the contact angle may approach 0 degrees as the droplet spreads to maximize its interfacial area of contact with the substrate, as for water on unoxidized metallic or ceramic surfaces. Where the surface repels water the droplet becomes more spherical to reduce its interfacial area of contact with the substrate. The onset for hydrophobicity is deemed to be when the angle of contact passes 90 degrees. Contact angles are known to have a mild sensitivity to the relative humidity of the atmosphere, however the effect is so small that this factor is typically ignored in practice. The methods and theory are well-known to persons of ordinary skill in the art thus they are not further elaborated here.

For polymeric materials according to this disclosure a contact angle with water of at least 70 degrees is desired. Contact angles of 90, 95, 105 or 115 degrees are also desirable, as they facilitate pouring of aqueous products, and reduce foaming of carbonated beverages. In one embodiment the contact angle is at least 70 degrees. In another embodiment the contact angle is at least 85 degrees. In a further embodiment the contact angle is at least 90 degrees. In one embodiment the contact angle is over 90 degrees. In some embodiments the contact angle is at least 95 degrees. In a particular embodiment the contact angle is between 95 and 115 degrees. In certain embodiments the contact angle is between 100 and 110 degrees. In another particular embodiment the contact angle is about 105 degrees. The latter embodiment is particularly expected when siloxane resin is about 40% of the intimate mixture composition by dry weight. In some embodiments the contact angle is 105±3 degrees.

N. Quantitative Ranges and Properties of Compositions

Resin Composition.

Cross-linkers and catalysts that are responsible for curing according to the disclosure, for a monomer, reactive oligomer, polymer precursor or reactive polymer, are deemed to be part of the corresponding resin for purposes of determining the resin's weight-percent reaction product constitution of the polymeric material.

Polymeric Material Composition.

In each embodiment the polymeric material is defined as the reaction products and other chemical residues of curing of the intimate mixture. Thus the polymeric material includes reaction products—including chemical residues—of the following species, to the extent that they participate in reactions of the cyclic ethers, acrylates and siloxanes and are not removed by, e.g., evaporation following curing: monomers; oligomers; precursor polymers; reactive polymer; cross-linkers; initiators; catalysts; and reaction rate modulating agents; to the extent that each participates in the curing reactions. Functional additives are deemed to be separate and distinct from the polymeric material for purposes of calculating the weight percent in which the polymeric material constitutes the packaging composition.

In some embodiments the polymeric material consists of reaction products of two of the thermosetting resins of the disclosure, and each constitutes from 10% to 90% of the polymeric material as measured by dry weight, where their percentages are inversely proportional to one another. In further embodiments their percent composition ranges are each respectively from 20% to 80%, from 30% to 70%, from 40 to 60%, or about 50%. In a particular embodiment they are from 30% to 70% or from 40% to 60%.

In certain embodiments the polymeric material consists of reaction products of all three of the thermosetting resins, wherein two of the thermosetting resins of have one of the proportion ranges shown above relative to each other, and in combination constitute at least 66.7% of the polymeric material as measured by dry weight, and reaction products of the third thermosetting resin constitute the remainder. In that instance, reaction products of the third thermosetting resin constitute up to 33.3% of the polymeric material. In further embodiments, reaction products of the third thermosetting resin constitute up to 30%, up to 25%, up to 20%, up to 15%, up to 10%, or up to 5% of the composition, and reaction products of the other two resins constitute the rest, having inversely paired proportion ranges relative to each other that are shown in the paragraph above.

In particular embodiments, reaction products from each of at least two of the thermosetting resins constitute 20% per resin of the polymeric material by dry weight. In certain embodiments, reaction products of a cyclic ether resin and an acrylate resin are present in a ratio of at least 1.33:1 by dry weight, respectively, within the polymeric material. In additional embodiments, reaction products of a cyclic ether resin and a siloxane resin are present in a ratio of at least 1.33:1 by dry weight, respectively, within the polymeric material. In further embodiments, reaction products of an acrylate resin and a siloxane resin are present in a ratio of at least 1.33:1 by dry weight, respectively, within the polymeric material.

Packaging Composition.

In some embodiments the polymeric material of the disclosure constitutes at least 10% of the food and beverage packaging composition as measured by dry weight. In further embodiments the percent composition is at least 20%, at least 30%, at least 40%, at least 50%, at least 60%, at least 70%, at least 80%, at least 90%, at least 95%, at least 96%, at least 97%, at least 98%, or at least 99%. In one embodiment the percent composition is at least about 99%.

Cross-Link Density.

The relative frequency and effects of cross-links can be expressed in various ways, and has long posed fundamental challenges for graph theory as well as for network polymers. A particularly useful way to quantify cross-link density for purposes of the present disclosure focuses on the skeletal bonds of a molecule. For purposes of clarity certain definitions are repeated in this section and elaborated upon.

In each of the examples just shown, the percentage of skeletal bonds that are network-forming can be raised. For instance, shorter inter-node chain segments could be employed. In addition or alternatively a formulator could employ cross-linkers (or chain segment end groups) that generate a higher average number of network-forming bonds per node. One may also mix a resin, e.g., for the epoxy just described, with a second resin that cross-links more extensively and has the same or a different type of polymerizable group—e.g., the second resin may be a more extensively thermosetting epoxy resin or may be, e.g., a siloxane resin such as benzyl triethoxy silane. As an illustrative non-limiting example, for a resin formed solely by condensation of benzyl triethoxy silane with water and fully cured and dried, the unit cell has 11 skeletal bonds of which 1 (i.e., ca. 9.1%) is network-forming. As a parallel example, for a resin formed solely from hydrolysis of methyl triethoxysilane, the unit cell has 4 skeletal bonds of which 1 (i.e., 25%) is network-forming. As a further such example, a resin formed solely by radical polymerization of dipentaerythritol pentaacrylate has 43 skeletal bonds in a unit cell, of which 8 (i.e., ca. 18.6%) are network-forming. For a resin formed solely by radical polymerization of di(acrylic acid)anhydride or di(acryloyl)methane, of 10 skeletal bonds per unit cell, 2 (i.e., 20.0%) are network-forming.

The percentages of network-forming bonds among skeletal bonds may also be lowered, for instance by employing significant amounts of monomer that form only linear chains, by using longer precursor polymers to form inter-node chain segments, by using appropriate chain transfer or end-capping reagents, or the like. It should be remembered in mixed-resin calculation that where a resin loses moieties—as through loss of alcohol molecules in the condensation of polysiloxanes—that its relative molar weight changes and this affects the calculation of average % network-forming bonds for the hybrid polymer.

Where ionic bonds are considered they should be counted in a straightforward manner. For an ionic bond between a quaternary ammonium and an organic sulfate this may be simple.

In various embodiments of the disclosure the percentage of skeletal bonds in the polymeric material that are network-forming is selected to be in the range from 4 to 40%, from 5 to 25%, from 6 to 20%, or from 7 to 10%. In certain embodiments the percentage is in the range of 4 to 8%. In alternative embodiments the percentage is in the range of 7 to 12%. In particular embodiments the percentage is in the range of 10 to 15%. In other embodiments the percentage is in the range of 15 to 20%. In various embodiments the percentage is in the range of 20 to 25%. In some embodiments the percentage is in the range of 25 to 30%. In further embodiments the percentage is in the range of 30 to 40%.

Alternative Measurements of Cross-Link Density.

In an alternative approach practitioners of ordinary skill in the relevant arts know that cross-link density for fully cured material can be calculated based on ratios of relevant reactive functional groups per chemical species in the intimate mixture and the relative multiplicity of relevant reactive groups per cross-linker. From this the weight of final product—where the product is assumed to be a single molecule for calculation purposes—can be used to calculate the associated number average weight per cross-link. In BPA-based epoxy coatings the corresponding value is commonly about 300 atomic mass units or more per cross-link. Cross-linked acrylic coatings tend to have even higher values.

Silicones have lower values but have not been used as widely or successfully as epoxy systems in food and beverage coatings. Polymeric compositions according to this disclosure have no more than 300 atomic mass units per cross-link. In particular embodiments the value is from 50 to 300, from 75 to 275, from 100 to 250, or from 150 to 200. In certain embodiments the value is 150+25.

Packaging Composition.

In some embodiments the polymeric material of the disclosure constitutes at least 10% of the food and beverage packaging composition as measured by dry weight. In further embodiments the percent composition is at least 20%, at least 30%, at least 40%, at least 50%, at least 60%, at least 70%, at least 80%, at least 90%, at least 95%, at least 96%, at least 97%, at least 98%, or at least 99%. In one embodiment the percent composition is at least about 99%.

Cross-Linkers.

In some embodiments cross-linkers are derived from particular molecular skeletons. By definition generally and also for the disclosure, a cross-link is capable of reacting such that it produces bonds to at least three other structural units in a polymer. In certain embodiments, the intimate mixture comprises a cross-linker that is capable of reacting to produce bonds to at least four or at least five other structural units in a polymer. In particular embodiments the intimate mixture comprises oligomeric or polymeric cross-linkers that consequently comprise many relevantly reactive functional groups for the formation of cross-links. Illustrative non-limiting embodiments of cross-linkers according to the disclosure include: epoxidized soybean oil; diamines, and oligomeric and polymeric alkylene amines; bisepoxides; bisdioxolanes; tri- and tetra-alkoxy siloxanes; di-, tri- and tetra-amine silazanes; and saccharides comprising sugars or sugar alcohols with a degree of polymerization of from 1 to 6, where the saccharides are esters of acrylic species or are covalently bonded to cyclic ethers such as, e.g., glycidyl ethers. In some embodiments the saccharides have a degree of polymerization of from 1 to 4, from 1 to 3, or from 1 to 2. In certain embodiments the intimate mixtures comprise cross-linkers of an otherwise identical type in which some form bonds to one particular number of structural units in a polymer, and some form bonds to a different particular number of structural units in a polymer. By way of non-limiting illustrative example: an epoxidized soybean oil may be used in which molecules of the sample differ in how many epoxide units they have per molecule; likewise a mixture of di-, tri- and tetra-amines may be used; likewise a mixture of oligo-functionalized saccharides may be used; likewise a mixture of tri- and tetra-alkoxy silanes may be used; and so forth.

In certain embodiments all acrylate moieties in the intimate mixture are covalently bonded to cross-linkers. In various other embodiments the intimate mixture has a molar ratio of acrylic monomer molecules to corresponding cross-linker molecules that is selected from a range of: from 100:1 to 1:100; from 50:1 to 1:50; from 20:1 to 1:20; from 10:1 to 1:10; from 5:1 to 1:5; from 2:1 to 1:2; or about 1:1. In particular embodiments the ratio is selected from a range of from 50:1 to 1:50.

In particular other embodiments all cyclic ether moieties in the intimate mixture are covalently bonded to cross-linkers. In various other embodiments the intimate mixture has a molar ratio of cyclic ether monomer molecules to corresponding cross-linker molecules that is selected from a range of: from 100:1 to 1:100; from 50:1 to 1:50; from 20:1 to 1:20; from 10:1 to 1:10; from 5:1 to 1:5; from 2:1 to 1:2; or about 1:1. In certain embodiments the ratio is selected from a range of from 10:1 to 1:10.

In additional embodiments all siloxane-forming moieties in the intimate mixture are covalently bonded to network-forming siloxanes. In various other embodiments the intimate mixture has a molar ratio of siloxane monomer molecules to corresponding cross-linker molecules that is selected from a range of: from 100:1 to 1:100; from 50:1 to 1:50; from 20:1 to 1:20; from 10:1 to 1:10; from 5:1 to 1:5; from 2:1 to 1:2; or about 1:1. In some embodiments the ratio is selected from a range of from 20:1 to 1:20.

Some cross-linking is likely inevitable at least at trace levels because of the modest tendency of carboxylic groups to form esters or transesterify when alcohols are in close proximity, and the modest tendency of hydroxyl groups to react with siloxane centers, and because poly ethers tend to contain alcohols and or amine functionalities that can attack either of those types of groups.

Interpenetrating Networks.

In some aspects, the polymeric material is an interpenetrating polymer network. In certain embodiments the cross-linked reaction products of at least one resin in the intimate mixture include no cross-links to polymers formed from the other resins. In other embodiments at least 10% of the cross-links in the reaction products of at least one resin are bonds to a type of polymer from one or both of the other two resins. In further embodiments the value is at least 20%, at least 30%, at least 40%, at least 50%, at least 60%, at least 70%, at least 80%, at least 90% or 100%. A non-limiting example of substantially no inter-type cross-links is where an intimate mixture is cured in two steps, e.g., first radical polymerization and cross-linking of a methylmethacrylate resin and then higher temperature ring-opening polymerization of an oxetane resin. A non-limiting example where substantially all cross-links are between different types of structural units is where, for instance, ethyl acrylate is polymerized radically, dimethyl dimethoxy silane is polymerized by condensation, and the only cross-linker species employed is divinyl dimethoxy silane; this might occur by either a one-phase or two-phase curing process. Persons of ordinary skill will recognize that many variations and permutations are possible to control the extent of inter-type cross-linking. In particular embodiments where uniformity of morphology and physical properties is desired, 100% inter-type cross-linking may be preferred so that phase separation and differences in domain size do not require management. In particular embodiments where uniformity of morphology and physical properties is desired, essentially 100% inter-type cross-linking may be preferred so that phase separation and differences in domain size do not require management. In embodiments where an ambiphilic surface is desired, essentially 100% intra-type cross-linking may be preferred so that a honeycomb morphology results and provides regular micro-scale variation in hydrophobicity. Analogous permutations and variations as understood by persons of ordinary skill in the art are contemplated by this disclosure.

Permeabilities.

The polymeric materials of the disclosure may be prepared in a manner that permits no more than twice the gas permeability of polyethylene terephthalate (PET) when used as a bottling plastic or coating. In many cases materials of the disclosure may be prepared in a manner that limits the respective diffusion rates to no more than half those found in PET. In particular, the materials' permeability toward dioxygen, carbon dioxide and water are in view as expressed in units of $10^{-13}$ $cm^3$ cm $cm^{-2}$ $s^{-1}$ $Pa^{-1}$, denoted in this paragraph simply as "units" for purposes of textual economy. Thus in certain embodiments the polymeric material disclosed herein has a permeability toward water of at most 200 units, at most 150 units, at most 100 units or at most 50 units. In particular embodiments, polymeric material of the disclosure has a permeability toward carbon dioxide of at most 0.4 units, at most 0.2 units, at most 0.1 units, or at most 0.05 units. In further embodiments polymeric material of the disclosure has a permeability toward carbon dioxide of at most 0.6 units, at most 0.03 units, at most 0.015 units, at most 0.009 units, or at most 0.003 units. The relative permeabilities of water, carbon dioxide and oxygen differ from one polymer type to the next; polymeric materials of the disclosure are believed to particularly improve on PET's barrier properties against carbon dioxide and dioxygen, in part because of higher densities, though this disclosure is not limited by a particular barrier mechanism.

Films and Coatings.

Films according to the disclosure may be prepared such that their thickness suits a particular application. Non-limiting illustrative ranges of film thickness include: from 1 to 2,500 microns; from 2 to 2000 microns; from 3 to 1500 microns; from 4 to 1000 microns; from 5 to 500 microns; from 6 to 400 microns; from 7 to 300 microns; from 8 to 200 microns; from 10 to 100 microns; from 15 to 75 microns; and from 20 to 50 microns. In a particular embodiment the film thickness is from 10 to 100 microns.

Coatings according to the disclosure may be prepared such that their thickness suits a particular application. Non-limiting illustrative ranges of coating thickness include: from 0.1 to 20 microns; from 0.5 to 15 microns; from 1 to 10 microns; and from 2 to 5 microns. In a particular embodiment the coating thickness is from 2 to 5 microns.

In certain embodiments the films or coatings may be provided as multilayered plastic films with iridescent properties. Methods for preparation of multilayer iridescent film are well-known, and are described for instance by J. A. Radford et al., in *Polym. Eng. & Sci.*, (1973) 13(3): 216-221. In such embodiments the films or coatings may be provided in a stack comprising from 2 to 500 layers; from 2 to 250 layers; from 3 to 100 layers; from 4 to 50 layers; or from 5 to 10 layers. In certain embodiments the multilayered iridescent films have from 2 to 5 layers and optionally comprise air pockets between layers. In particular embodiments the thickness of the individual layers for the multilayered plastic is selected from one of the following ranges: from 0.01 to 20 microns thick; from 0.1 to 10 microns thick, from 1 to 8 microns thick; or from 2 to 5 microns thick. In one embodiment the thickness of each individual layer is at least 2 but no more than 5 microns thick. In certain embodiments each layer comprises a polymeric material according to the disclosure; in alternative embodiments some but not all layers comprise a polymeric material.

Adhesion Quality.

Coatings and laminates according to the disclosure may be evaluated by their adhesion quality. In some embodiments the disclosed polymeric materials when adhered to a metal surface and especially an aluminum or aluminum alloy surface have a blush rating of at least 7. In particular embodiments the blush rating for the material as produced and initially adhered is at least 7, at least 8, at least 9, or is 10 or about 10. In certain preferred embodiments the blush rating is no less than 9. In some embodiments the blush rating after treatment in a DOWFAX® test is at least 4, at least 5, at least 6, at least 7, at least 8, at least 9, or is 10 or about 10.

In further embodiments the polymeric material as produced and initially adhered to the same metal has an adhesion rating of at least 7, at least 8, at least 9, or is 10 or about 10, as measured by Test Method B of ASTM D 3359-97. In further embodiments the polymeric material has an adhesion rating of at least 4, at least 5, at least 6, at least 7, at least 8, at least 9, or is 10 or about 10, as measured by the same test method after treatment of the sample by DOWFAX® test conditions, i.e., where the coated meal has resided for 15 minutes in a boiling solution of 3 liters of water containing 5 mL anionic surfactant DOWFAX® 2A1, and has then been cooled in deionized water and dried.

In additional embodiments the coating's adhesion rating falls by no more than 3, 2, 1 or 0.5 units when a Taber® abrasion test or steel wool test is performed. In certain embodiments the coating's adhesion rating is substantially unaffected when a Taber® abrasion test or steel wool test is performed.

In certain embodiments the adhesion of the polymer material as produced and initially adhered to the same metal remains substantially intact after the substrate is flexed by 0.50 mm per cm of width and or length of the substrate. In additional embodiments the adhesion remains substantially intact when the extent of flex by the same measurement is 1.00 mm/cm, 1.50 mm/cm, 2.00 mm/cm, 2.50 mm/cm, 3.00 mm/cm, 3.50 mm/cm, 4.00 mm/cm, 4.50 mm/cm or 5.00 mm/cm.

In particular embodiments the adhesion of the polymer material as produced and initially adhered to the same metal remains substantially intact after the substrate is flexed by 0.50 mm per cm of width and or length of the substrate.

In still other embodiments, adhesion of the coating to the substrate surface remains substantially intact after the substrate's reverse side has received an impact by an object uniformly over a surface area that is 10 cm$^2$ in size and which has a momentum of 25 µN/s, and wherein the coating is exposed to a carbonated or uncarbonated aqueous solution during a period from at least 24 hours prior to the impact to at least 24 hours following the impact. In still other embodiments the adhesion remains substantially intact when, other factors being the same, the momentum is 30 µN/s, 35 µN/s, 40 µN/s, 45 µN/s or 50 µN/s.

In additional embodiments the adhesion of the polymer material as produced and initially adhered to the same metal retains a rating of at least 7, at least 8, at least 9, or 10 or about 10, after the substrate is exposed to a carbonated or uncarbonated aqueous solution such as a cola or other soda beverage, when the pH between 2.4 and 2.5, the temperature is between 20 and 25° C., and the exposure time is for up to 6 months, up to 12 months, up to 18 months or up to 24 months. In certain embodiments, following the exposure period the coating remains free of defects that are visible to the naked eye, such as cracks, pores, perforations, surface etching and the like. In particular embodiments the adhesion of the polymer material satisfies the same criteria when the exposure period is 7 days but the temperature is 30° C. In other embodiments the adhesion of the polymer material satisfies the same criteria when the exposure period is 10 days but the temperature is 40° C. and the solution comprises 20% ethanol by weight.

In still other embodiments the adhesion of the polymeric material as produced and initially adhered to the same metal retains a rating of at least 7, at least 8, at least 9, or 10 or about 10, after the substrate is exposed to a hot solution for an extended period of time. In a particular embodiment the solution temperature is within the range of 85° C. to 130° C., the exposure period of adhered polymer material is 1.5 hours, the solution is water and the exposure occurs at a pressure selected from a range of 0.65 to 1.10 kg/cm².

Functional Additives.

In certain embodiments functional additives are provided in a range up to 50% of the final composition by dry weight. In various embodiments the additives are provided in a range of up to 40%, up to 30%, up to 20%, up to 10% and up to 5%. In particular embodiments the additives are provided in a range of 0.01 to 20.0%, 0.1 to 10.0%, 0.5 to 8.0%, 0.75 to 6.0%, 1.0 to 4.0%, or 2.0 to 3.0% or about 2.5%. In one embodiment the additives are provided in a range of 0.1 to 10.0%.

Glass Transition Temperatures.

In various embodiments the thermosetting resins and additives as well as their cure schedule are selected to result in ranges for $T_g$. The values for representative polymers from each resin category are diverse. Moderate-$T_g$ epoxy polymers are in a range around 75° C. Acrylates tend to be glassy, thus linear poly(acrylic esters) have $T_g$ ranging from 10 to 35° C. and linear poly(methacrylic esters) have $T_g$ ranging from 20 to 100° C., depending on the length of alkyl groups in the alkyl esters; PMMA has a $T_g$ of 100° C.; the $T_g$ range for acrylamides is at substantially higher corresponding temperatures, e.g., 165° C., other structural factors being the same. Silicones such as polydimethylsiloxane (PDMS) and silicone rubbers tend to have a very low $T_g$, generally quoted in the vicinity of −125° C., however extensive cross-linking raises this value; the differences can be dramatic as is clear at the maximum possible extent of siloxane cross-linking (silica in quartz), for which $T_g$=1,200° C.

Upon curing, intimately mixed thermosetting resins with cross-links tend to have an apparently single $T_g$ if the intertype cross-links are predominant. The preferred $T_g$ is defined by the range at which a practical balance of adhesion, flexibility and impermeability is obtained. In some embodiments, mixed thermosetting epoxy and acrylate resins are particularly desirable in a $T_g$ range of 20 to 100° C., and more desirable still in a $T_g$ range of 40 to 80° C., or about 60° C., but the disclosure is no so limited. Methods for determining $T_g$ are well-known in the art. Extrinsic factors such as atmospheric humidity that affect $T_g$ are also known but have only mild effects on the $T_g$ of a cured polymer that is substantially dry. The $T_g$ values in this paragraph and the one immediately preceding it are illustrative and non-limiting.

Density.

In various embodiments the thermosetting resins and additives are selected to provide a density value that falls within a certain range at a temperature of 23° C. In particular embodiments the density ranges are selected to fall within in a range as follows: from 0.8 to 1.8 g/mL; from 0.9 to 1.7 g/mL; from 1.0 to 1.6 g/mL; from 1.1 to 1.5 g/mL; from 1.2 to 1.4 g/mL; or about 1.3 g/mL.

Absorption of Organoleptic Compounds.

A consumer's ability to notice the loss of organoleptic compound from foods and beverages varies with the compound and to some extent varies with the consumer's sensitivity. In general such losses—whether by evaporation, absorption into container materials, spontaneous conversion to other compounds e.g. upon exposure to light, or losses by other means—become detectable when about 20% of a compound is lost, resulting in decreased flavor intensity and/or in off-flavors. Because flavoring compounds are often a diverse and complex mix, marker compounds are often used to assess their relative persistence in contact with container materials. In particular embodiments, during a 4-week exposure period at 30° C. when the composition comprising the polymeric material of the disclosure is a coating on the interior of a food or beverage container, the coating absorbs no more than 20% of an organoleptic marker compound that is present in a beverage. In various embodiments, other factors being the same, the coating absorbs no more than 15%, no more than 10%, no more than 5%, no more than 2.5%, or no more than 1% in that test. In certain embodiments a marker is a polar compound. In certain embodiments a marker is a nonpolar compound. In a particular embodiment the coating absorbs no more than 5% of polar marker compounds and no more than 5% of apolar marker compounds during that test.

Release of Synthetic Compounds.

In particularly preferred embodiments, compositions according to the disclosure release at most trace amounts of synthetic compounds into aqueous beverages with which they are in contact. In various embodiments the compositions when provided as interior coatings on beverage-filled containers and held at room temperature for six months release synthetic compounds in an amount of: no more than 200 mg/L; no more than 150 mg/L; no more than 100 mg/L; no more than 90 mg/L; no more than 80 mg/L; no more than 70 mg/L; no more than 60 mg/L; no more than 50 mg/L; no more than 40 mg/L; no more than 30 mg/L; no more than 20 mg/L; or no more than 10 mg/L. In certain embodiments they release less than 60 mg/L of non-volatile synthetic organic compounds under those conditions for carbonated or non-carbonated aqueous beverages.

EXAMPLES

The following examples are intended to illustrate embodiments of the disclosure and should not be construed as limiting the disclosure in any way.

Any testing methods that are cited herein using an ASTM serial number refer to standardized testing protocols as promulgated and maintained by ASTM International, formerly known as the American Society for Testing and Materials. The Taber® abrasion test is carried out according to ASTM D4060-10.

Organoleptic Marker Comparative Retention Test Protocol.

Aluminum cans that are internally coated with a layer 2-5 microns thick of cured compositions comprising polymeric materials according to the disclosure are filled with cola beverage and stored at 30° C. The relative flavor loss of the beverage is measured at 1- and 4-week intervals and compared with the performance of traditional epoxy-coated cans based on the change relative to standardized initial concentrations of limonene and octanal in the beverage. The benchmark for loss criteria is less than about 1% loss after one week and less than about 3% after four weeks at 30° C.

Contact Angle with Water.

Compositions comprising polymeric materials according to this disclosure are tested for their contact angle with water. The threshold benchmark is 70 degrees. The benchmark for threshold hydrophobicity is exceeding 90 degrees. The benchmark for substantial hydrophobicity is 105 degrees.

Water Absorption.

Compositions comprising polymeric materials according to this disclosure also are tested for their water absorption. The compositions are laminated onto an oxygen barrier packaging material and exposed to an aqueous solution held at 30° C. in the substantial absence of oxygen. The exposure represents 0.50 mL of an aqueous solution per 1.0 cm² of the sample's surface area. The test criterion is whether the sample absorbs no more than 5% by weight of water over a period of 6 months.

Examples 1-15

In the table below, the resins are thermosetting resins and E=cyclic ether resin, A=acrylate resin and S=siloxane resin. The designation NF % means approximate theoretical percentage of network-forming bonds among the skeletal bonds of the reaction product for a fully cured mixture. However, the synthetic procedure does not rely on this theoretical percentage of network-forming bonds being achieved when cured. The weighted average is the weighted average of NF % values as calculated by weight percent; byproducts such as ethanol created by siloxane condensation are not part of the polymer and thus the weight percentages of starting monomers and cross-linkers are not necessarily the same as the weight products for the reaction products of each resin when only the polymeric material is considered, as here. Target thicknesses for coatings are 2-5 microns.

Example 1

| RESINS (IN WT %) | | NF % | OTHER (WT %) | SUBSTRATE + CURE |
|---|---|---|---|---|
| E | Isosorbide diglycidyl ether + maleic anhydride; (8) | 3.85% | Water (74) Ethanol (10) Catalysts (4) | Al can interior, sprayed; 180-220° C. |

| RESINS (IN WT %) | | NF % | OTHER (WT %) | SUBSTRATE + CURE |
|---|---|---|---|---|
| A | | | | |
| S | Benzyltriethoxysilane, (6) | 9.1% | | |
| | WEIGHTED AVERAGE (POLYMERIC) | 5.4% | | |

Example 2

| RESINS (IN WT %) | | NF % | OTHER (WT %) | SUBSTRATE + CURE |
|---|---|---|---|---|
| E | Isosorbide diglycidyl ether + maleic anhydride; (8) | 3.85% | Water (74) Ethanol (10) Catalysts (4) Octanal (0.001) | Al can interior, sprayed; 180-220° C. |
| A | | | | |
| S | Benzyltriethoxysilane, (6) | 9.1% | | |
| | WEIGHTED AVERAGE | 5.4% | | |

Example 3

| RESINS (IN WT %) | | NF % | OTHER (WT %) | SUBSTRATE + CURE |
|---|---|---|---|---|
| E | — | | Water (74) Ethanol (10) Catalysts (4) Rad. Init. (0.1) | Al can interior, sprayed; 180-220° C. |
| A | Dipentaerythritol pentaacrylate; (8) | 18.6% | | |
| S | Benzyltriethoxysilane; (6) | 9.1% | | |
| | WEIGHTED AVERAGE | 15.8% | | |

Example 4

| RESINS (IN WT %) | | NF % | OTHER (WT %) | SUBSTRATE + CURE |
|---|---|---|---|---|
| E | — | | Water (74) Ethanol (10) Rad. Init. (0.1) Catalysts (4) Octanal (0.001) | Al can interior, sprayed; 180-220° C. |
| A | Dipentaerythritol pentaacrylate; (8) | 18.6% | | |
| S | Benzyltriethoxysilane; (6) | 9.1% | | |
| | WEIGHTED AVERAGE | 15.8% | | |

Example 5

| RESINS (IN WT %) | | NF % | OTHER (WT %) | SUBSTRATE + CURE |
|---|---|---|---|---|
| E | Isosorbide diglycidyl ether + maleic anhydride; (8) | 3.85% | Water (72) Ethanol (10) $H_2O_2$ (2) Cationic. Init. (2) | Al can interior, sprayed; 180-220° C. |
| A | Dipentaerythritol pentaacrylate; (6) | 18.6% | | |
| S | — | | | |
| | WEIGHTED AVERAGE | 10.2% | | |

Example 6

| RESINS (IN WT %) | | NF % | OTHER (WT %) | SUBSTRATE + CURE |
|---|---|---|---|---|
| E | Isosorbide diglycidyl ether + maleic anhydride; (8) | 3.85% | Water (71) Ethanol (10) | Al can interior, sprayed; |

-continued

| RESINS (IN WT %) | NF % | OTHER (WT %) | SUBSTRATE + CURE |
|---|---|---|---|
| A Dipentaerythritol pentaacrylate; (6) | 18.6% | $H_2O_2$ (2) | 180-220° C. |
| S Benzyltriethoxysilane; (1) | 9.1% | Cationic. Init. (2) | |
| WEIGHTED AVERAGE | 10.1% | | |

Example 7

| RESINS (IN WT %) | NF % | OTHER (WT %) | SUBSTRATE + CURE |
|---|---|---|---|
| E Isosorbide diglycidyl ether + maleic anhydride; (8) | 3.85% | Water (71) Ethanol (10) | Al can interior, sprayed; 180-220° C. |
| A Dipentaerythritol pentaacrylate; (6) | 18.6% | $H_2O_2$ (2) | |
| S Benzyltriethoxysilane; (1) | 9.1% | Cationic. Init. (2) Octanal (0.001) | |
| WEIGHTED AVERAGE | 10.1% | | |

Example 8

| RESINS (IN WT %) | NF % | OTHER (WT %) | SUBSTRATE + CURE |
|---|---|---|---|
| E Isosorbide diglycidyl ether + maleic anhydride; (11) | 3.85% | Remainder | |
| A — | | | |
| S Methyltriethoxysilane; (3) | 25.0% | | |
| WEIGHTED AVERAGE | 5.8% | | |

Example 9

| RESINS (IN WT %) | NF % | OTHER (WT %) | SUBSTRATE + CURE |
|---|---|---|---|
| E Isosorbide diglycidyl ether + maleic anhydride; (2) | 3.85% | Remainder | |
| A — | | | |
| S Methyltriethoxysilane; (12) | 25.0% | | |
| WEIGHTED AVERAGE | 18.5% | | |

Example 10

| RESINS (IN WT %) | NF % | OTHER (WT %) | SUBSTRATE + CURE |
|---|---|---|---|
| E Isosorbide diglycidyl ether + maleic anhydride; (2) | 3.85% | Remainder | |
| A Diacryloyl methane (6) | 20.0% | | |
| S Methyltriethoxysilane; (6) | 25.0% | | |
| WEIGHTED AVERAGE | 18.0% | | |

Example 11

| RESINS (IN WT %) | NF % | OTHER (WT %) | SUBSTRATE + CURE |
|---|---|---|---|
| E 5 Ethylene oxide: 1 vinyl oxirane; (7) | 9.5% | Remainder | |
| A Diacryloyl methane (9) | 20.0% | | |
| S Methyltriethoxysilane; (4) | 25.0% | | |
| WEIGHTED AVERAGE | 16.2% | | |

Example 12

| RESINS (IN WT %) | NF % | OTHER (WT %) | SUBSTRATE + CURE |
|---|---|---|---|
| E 10 Propylene oxide: 1 vinyl oxirane; (8) | 4.35% | Remainder | |
| A Diacryloyl methane (5) | 20.0% | | |
| S Methyltriethoxysilane; (11) | 25.0% | | |
| WEIGHTED AVERAGE | 17.1% | | |

Example 13

| RESINS (IN WT %) | NF % | OTHER (WT %) | SUBSTRATE + CURE |
|---|---|---|---|
| E 1,3-benzene-3-dioxetane; (8) 2-vinyl dioxolane; (2) | 15.0% | Remainder | |
| A Methylmethacrylate; (2) Ethylacrylate; (3) Diacrylic acid anhydride (1) | 3.3% | | |
| S — | | | |
| WEIGHTED AVERAGE | 10.6% | | |

Example 14

| RESINS (IN WT %) | NF % | OTHER (WT %) | SUBSTRATE + CURE |
|---|---|---|---|
| E 2-vinyl dioxolane; (5) | 25.0% | Remainder | |
| A — | | | |
| S Dimethyl diethoxy silane; (5) Tetraethoxy silane; (5) | 18.3% | | |
| WEIGHTED AVERAGE | 22.0% | | |

Example 15

| RESINS (IN WT %) | NF % | OTHER (WT %) | SUBSTRATE + CURE |
|---|---|---|---|
| E 2-vinyl oxetane; (10) | 33.3% | Remainder | |
| A — | | | |
| S Tetraethoxy silane; (24.3) | 50.0% | | |
| WEIGHTED AVERAGE | 40.0% | | |

Example 16

Epoxy/Acrylate Hybrid (High Crosslink Density) Resin for Coatings

| | Example 16.1 | | Example 16.2 | |
|---|---|---|---|---|
| Component | weight (g) | wt % | weight (g) | wt % |
| tripropylene glycol diacrylate | 4.74 | 4.7% | 4.74 | 4.7% |
| propoxylated neopentyl glycol diacrylate (propoxylated NPG diacrylate) | | | 4.74 | |
| trimethylolpropane triacrylate (TMPTA) | 4.74 | 4.7% | | |
| CHDMGE | 9.48 | 9.5% | 9.48 | 9.5% |
| t-butylperoxybenzoate | 0.8 | 0.8% | 0.8 | 0.8% |
| 2,4,6-tris(dimethylamino)-phenol | 0.24 | 0.2% | 0.24 | 0.2% |
| Aerosol OT | 1 | 1.0% | 1 | 1.0% |
| ethanol | 14 | 14.0% | 14 | 14.0% |
| water | 65 | 65.0% | 65 | 65.0% |
| total | 100 | 100.0% | 100 | 100.0% |
| Tg (° C.) | 75 | | 62 | |

The experimental details of the epoxy-acrylate interpenetrating polymer resins and the glass transition temperatures in this example are presented in the table.

Example 16.1

A 9.48 g sample of epoxy (1,4-cyclohexanedimethanol diglycidyl ether (CHDMGE or CHDMEP)), 4.74 g of acrylic monomer (tripropylene glycol diacrylate), 4.74 g of another acrylic monomer, trimethylolpropane triacrylate (TMPTA), 1 g of Aerosol OT (dioctyl sodium sulfosuccinate surfactant), and 14 g of ethanol were weighed out and combined into a 150 mL glass sample vial, and gently agitated by hand. This gentle agitation was often sufficient to achieve thorough mixing due to the general miscibility of these materials. A 0.24 g sample of 2,4,6-tris (dimethylamino) phenol was added to this mixture then shaken gently again to ensure general dispersibility. Finally, 0.8 g t-butylperoxybenzoate (also termed, t-butyl benzoperoxoate, PhCO$_2$O-t-Bu) and 65 g of water were added and initially shaken by hand, followed by stirring with a magnetic stir bar at about 250 rpm for 1 hour. A coating was then prepared from the resulting composition, as follows.

Coatings were made using a coating wire rod onto aluminum plates (3 inch×6 inch coupon of Alcoa 5182 H19 chrome treated aluminum or Gardco 3003 H14 aluminum test panels). Coatings were then cured in an oven at a 220° C. set point for 10 minutes. The dry film thickness was about 2-5 microns.

Differential Scanning calorimetry (DSC) measurements were performed in the TA Q2000 DSC instrument. In a typical run, 3-14 mg of sample were weighed and sealed into a normal DSC pan, along with a weighed reference. The sample was analyzed in the DSC using the T4 method at 10° C./min for heating cycles and 5° C./min for cooling cycles. A heat-cool-heat cycle was used to remove the thermal history from the sample, that is, the sample was heated from room temperature to 150° C., cooled to −75° C., and re-heated to 150° C. For each trace, a clean inflection point was noted at the occurrence of Tg (glass transition temperature), and no samples exhibited any spurious peaks at the end of the Tg peak, which would have otherwise indicated a lack of thermal aging. The Tg was measured as the center of the inflection point. No other thermal transitions were noted in the DSC trace.

The Tg value for this sample was found to be 75° C.

Example 16.2

A 9.48 g sample of epoxy (1,4-cyclohexanedimethanol diglycidyl ether (CHDMGE or CHDMEP)), 4.74 g of acrylic monomer (tripropylene glycol diacrylate), 4.74 g of another acrylic monomer, propoxylated neopentyl glycol diacrylate (propoxylated NPG diacrylate), 1 g of Aerosol OT, and 14 g of ethanol were weighed out and combined in a 150 mL glass sample vial and gently agitated by hand. This gentle agitation was often sufficient to achieve thorough mixing due to the general miscibility of these materials. A 0.24 g sample of 2,4,6-tris (dimethylamino) phenol was added to this mixture then shaken gently again to ensure general dispersibility. Finally, 0.8 g t-butylperoxybenzoate (t-butyl benzoperoxoate) and 65 g of water were added and initially shaken by hand, followed by stirring with a magnetic stir bar at about 250 rpm for 1 hour. A coating was then prepared from the resulting composition, as follows.

Coatings were made using a coating wire rod onto aluminum plates (3 inch×6 inch coupon of Alcoa 5182 H19 chrome treated aluminum or Gardco 3003 H14 aluminum test panels). Coatings were then cured in an oven at a 220° C. set point for 10 minutes. The dry film thickness was about 2-5 microns.

Differential Scanning calorimetry (DSC) measurements were performed in the TA Q2000 DSC instrument. In a typical run, 3-14 mg of sample were weighed and sealed into a normal DSC pan, along with a weighed reference. The sample was analyzed in the DSC using the T4 method at 10° C./min for heating cycles and 5° C./min for cooling cycles. A heat-cool-heat cycle was used to remove the thermal history from the sample, that is, the sample was heated from room temperature to 150° C., cooled to −75° C., and re-heated to 150° C. For each trace, a clean inflection point was noted at the occurrence of Tg (glass transition temperature), and no samples exhibited any spurious peaks at the end of the Tg peak, which would have otherwise indicated a lack of thermal aging. The Tg was measured as the center of the inflection point. No other thermal transitions were noted in the DSC trace.

The Tg value for this sample was found to be 62° C.

Example 17

Epoxy/Acrylate Hybrid (Hydrophobic) Resin for Coatings

|  | Example 17 | |
| --- | --- | --- |
| Component | weight (g) | wt % |
| tripropylene glycol diacrylate | 4.74 | 4.7% |
| TMPTA | 4.74 | 4.7% |
| CHDMGE | 9.48 | 9.5% |
| t-butylperoxybenzoate | 0.8 | 0.8% |
| 2,4,6-tris(dimethylamino)phenol | 0.24 | 0.2% |
| benzyltriethoxysilane | 1 | 1.0% |
| Aerosol OT | 1 | 1.0% |
| ethanol | 14 | 14.0% |
| water | 64 | 64.0% |
| total | 100 | 100.0% |

The experimental details of the epoxy-acrylate interpenetrating polymer resins made and analyzed according to the following examples are presented in the table.

Example 17.1—Resin Preparation

A 9.48 g sample of epoxy (1,4-cyclohexanedimethanol diglycidyl ether (CHDMGE or CHDMEP)), 4.74 g of acrylic monomer (tripropylene glycol diacrylate), 4.74 g of another acrylic monomer, trimethylolpropane triacrylate (TMPTA), 1 g of Aerosol OT, 1 g of benzyltriethoxysilane, and 14 g of ethanol were weighed out and combined into a 150 mL glass sample vial, and gently agitated by hand. This gentle agitation was often sufficient to achieve thorough mixing due to the general miscibility of these materials. A 0.24 g sample of 2,4,6-tris (dimethylamino) phenol was added to this mixture then shaken gently again to ensure general dispersibility. Finally, 0.8 g t-butylperoxybenzoate and 65 g of water were added and initially shaken by hand, followed by stirring with a magnetic stir bar at about 250 rpm for 1 hour. A coating was then prepared from the resulting composition, as follows.

Coatings were made using a coating wire rod onto glass slides (3 inch×1 inch). Coatings were then cured in an oven at a 220° C. set point for 10 minutes. The dry film thickness was about 2-5 microns.

The water contact angle was observed to be 105°.

Example 17.2—Resin Testing

A 1 ppm aldehyde solution at pH 3 was prepared as follows.

Step 1.

Intermediate aldehyde stock solutions (about 10,000 ppm) were prepared by diluting known amounts of three aldehydes (octanal, nonanal and decanal) in pure (200 proof)

ethanol, because ethanol is a good solvent to dissolve the aldehydes and the resulting solution is soluble in acidified water.

Step 2.

Water acidified to pH 3 was prepared by adding approximately 1.5 mL of 75% phosphoric acid into 10 liters of DI (de-ionized) water, and the pH is checked using pH paper to ensure the pH is about pH 3. The pH is adjusted using more phosphoric acid or DI water to a final pH of from about 2.5 to about 3, for the following tests. A known amount of stock aldehyde solution is then added into the acidified water with a dilution factor of about 10,000, to obtain a final aldehyde concentration of about 1 ppm.

Sample Preparation and Conditioning.

The coated glass slides prepared as above were soaked in amber vials filled with the above-described 1 ppm aldehyde solutions and maintained at 40° C. for 7 days. Specifically, the samples slides were placed standing vertically into 8 fl. oz. Qorpak, Wide-Mouth, French Square Bottles with PTFE lined caps (VWR: 16189-121). A layer of 4 mm Hollow Glass Beads (Fisher Scientific: 11-311A) was used at the bottom of the bottle to ensure spacing between slides. A 160 mL portion of 1 ppm Aldehyde Solution (1 ppm octanal, 1 ppm nonanal, and 1 ppm decanal in D.I. (deionized) water at pH 3) was added to the sample bottles. Samples were briefly swirled to ensure good coating of the solution on the slides. Samples were stored at 40° C. for seven days.

Aldehyde Loss Analysis.

The headspace solid-phase microextraction (HS-SPME) method was used to evaluate flavor scalping performance. The GC injection port was equipped with a 0.75 mm i.d. liner (Supelco) to minimize peak broadening. For the headspace analysis, the injection was performed in the split mode (1:40) for 8 min at 250° C. Oven temperature was programmed at 45° C. isothermally for 5 min, then ramped to 51° C. at 1° C./min and held for 5 min at 51° C. then increased to 160° C. at 5° C./min and finally raised to 250° C. at 12° C./min and held for 15 min at the final temperature. Helium was used as the carrier gas with a flow-rate of 1.1 ml/min. Injector and detector temperatures were 250° C. and 270° C., respectively.

Each sample was tested in duplicate 5 mL of the solution inside each bottle was pipetted to a 20 mL SPME screw cap vial and immediately capped with a magnetic screw cap with silicone/PTFE septum. Samples were then tested by solid-phase microextraction (SPME)-GC/MS.

Results.

The quantitative results for total peak area reduction in the samples are summarized in Table 1. The main area reduction came from decanal in solution.

TABLE 1

Reduction of total peak area in samples.

| Sample | Peak Area | | | Aldehyde Loss |
|---|---|---|---|---|
| | Test 1 | Test 2 | Average | |
| Glass control | 1.34E+09 | 1.21E+09 | 1.3E+09 | N/A |
| Example 17.1 | 9.47E+08 | 9.42E+08 | 9.4E+08 | 26% |
| Conventional BPA epoxy control | 9.24E+08 | 9.54E+08 | 9.4E+08 | 26% |
| Comparative acrylate BPANI coating 1 | — | — | — | 67% |

TABLE 1-continued

Reduction of total peak area in samples.

| Sample | Peak Area | | | Aldehyde Loss |
|---|---|---|---|---|
| | Test 1 | Test 2 | Average | |
| Comparative acrylate BPANI coating 2 | | | | 85% |

Conventional BPA-containing epoxy coatings such as the epoxy control coating of Table 1 include Bisphenol A, BADGE and derivatives, styrene, and crosslinkers. Optionally, a small amount of acrylate latex can be used as a portion of the components to react with epoxys in the mixture. However, when used the acrylate latex is polymer before it is mixed in the mixture. Therefore, the properties of the overall polymer network in these conventional epoxy coatings are mostly depending on the BPA containing epoxies because the acrylate latex is loosely associated or connected with the epoxy polymer network.

This feature distinguishes and differentiates the traditional BPA-containing epoxy coatings from the epoxy/acrylate interpenetrating network (IPN) of this disclosure such as the Example 17.1 composition, because the acrylate monomers are participated in the epoxy/acrylate IPN from the beginning of reactions. The properties of this type of IPN will depend on both epoxys and acrylates in the composition.

Unless indicated otherwise in this disclosure, when a range of any type is disclosed or claimed, for example a range of the number of carbon atoms, viscosities, temperatures, and the like, it is intended to disclose or claim individually each possible number that such a range could reasonably encompass, including any sub-ranges encompassed therein. For example, when describing a range of the number of carbon atoms, each possible individual integral number and ranges between integral numbers of atoms that the range includes are encompassed therein. Thus, by disclosing a $C_1$ to $C_{10}$ alkyl group or an alkyl group having from 1 to 10 carbon atoms or "up to" 10 carbon atoms, Applicants' intent is to recite that the alkyl group can have 1, 2, 3, 4, 5, 6, 7, 8, 9, or 10 carbon atoms, and these methods of describing such a group are interchangeable. When describing a range of measurements, every possible number that such a range could reasonably encompass can, for example, refer to values within the range with one significant digit more than is present in the end points of a range. Applicants' intent is that these two methods of describing the range are interchangeable.

Moreover, when a range of values is disclosed or claimed, which Applicants intent to reflect individually each possible number that such a range could reasonably encompass, Applicants also intend for the disclosure of a range to reflect, and be interchangeable with, disclosing any and all sub-ranges and combinations of sub-ranges encompassed therein. In this aspect, Applicants' disclosure of a $C_1$ to $C_{10}$ alkyl group is intended to literally encompass a $C_1$ to $C_6$ alkyl, a $C_4$ to $C_8$ alkyl, a $C_2$ to $C_7$ alkyl, a combination of a $C_1$ to $C_3$ and a $C_5$ top $C_7$ alkyl, and so forth. Accordingly, Applicants reserve the right to proviso out or exclude any individual members of any such group, including any sub-ranges or combinations of sub-ranges within the group, if for any reason Applicants choose to claim less than the full measure of the disclosure, for example, to account for a reference that Applicants are unaware of at the time of the filing of the application.

Unless otherwise indicated, if a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Any headings that may be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

We claim:

1. A coating composition for use in food and beverage packaging, comprising a polymeric reaction product formed from a mixture of:
   a) at least one cyclic ether monomer selected from the group consisting of isorbide diglycidyl ether, ethylene oxide and vinyl oxirane in a 5:1 ratio by weight, propylene oxide and vinyl oxirane in a 10:1 ratio by weight, and 1,4-cyclohexanedimethanol diglycidyl ether,
   b) at least one polyacrylate monomer selected from the group consisting of dipentaerythritol pentaacrylate, diacryloyl methane, tripropylene glycol diacrylate, propoxylated neopentyl glycol diacrylate, and trimethylolpropane triacrylate,
   c) a free radical initiator,
   d) at least one surfactant, and
   e) a carrier liquid, wherein:
   from 5% to 25% of skeletal bonds in the polymeric reaction product are network-forming bonds; and
   the coating composition is substantially free of BPA, BPF, BADGE and BFDGE.

2. The coating composition according to claim 1, wherein the polymeric reaction product constitutes at least 20% of the coating composition as measured by dry weight.

3. The coating composition according to claim 1, wherein the mixture further comprises a cross-linker in an amount from about 0.1% to about 10% by weight.

4. The coating composition according to claim 1, wherein the mixture further comprises a condensation-type cross-linking resin selected from methylated and butylated melamines, alkylated and imino mixed ether melamines, alkylated ureas, formaldehyde-free modified ureas, benzoguanamine, glycoluril, and combinations thereof.

5. The coating composition according to claim 1, wherein the mixture further comprises a catalyst selected from a tetraalkyl ammonium halide, a tetraalkyl phosphonium iodide or acetate, a tetraaryl phosphonium iodide or acetate, tin octoate, zinc octoate, triphenylphosphine, or any combination thereof.

6. The coating composition according to claim 1, wherein:
   a) the at least one cyclic ether monomer is 1,4-cyclohexanedimethanol diglycidyl ether; and
   b) the at least one polyacrylate monomer is tripropylene glycol diacrylate, trimethylolpropane triacrylate, propoxylated neopentyl glycol diacrylate, or any combination thereof.

7. The coating composition according to claim 1, wherein the at least one acrylate monomer is from about 4.7 wt % to about 9.4 wt % of the mixture.

8. The coating composition according to claim 1, wherein the at least one cyclic ether monomer is about 9.5 wt % of the mixture.

9. The coating composition according to claim 1, wherein the free-radical initiator comprises t-butylperoxybenzoate.

10. The coating composition according to claim 1, wherein the at least one surfactant comprises 2,4,6-tris(dimethylamino)phenol and/or sodium bis(2-ethylhexyl)sulfosuccinate.

11. A food and beverage container comprising:
    a) a metal selected from aluminum, aluminum alloys, steel, steel alloys, tin, tin alloys, zinc, zinc alloys, chrome or chrome alloys; and
    b) a coating formed from the coating composition according to claim 1 at least partially coating a surface of the metal.

12. The food and beverage container according to claim 11, wherein the coating is from 0.1 to 20 microns thick and has a contact angle with water of at least 70 degrees.

13. The food and beverage container according to claim 11, wherein the coating remains intact after the coating has been in contact with an aqueous solution having a pH between 2.4 and 2.5 for a period of 12 months at a temperature between 20° C. and 25° C.

14. The food and beverage container according to claim 11, wherein the coating remains intact after the side of the metal opposite the coating receives an impact by an object uniformly over a 10 cm² surface area having a momentum of 25 µN/s, and wherein the coating is exposed to a carbonated or uncarbonated aqueous solution during a period from at least 24 hours prior to the impact to at least 24 hours following the impact.

15. The food and beverage container according to claim 11, wherein:
    a) the at least one cyclic ether monomer is 1,4-cyclohexanedimethanol diglycidyl ether; and
    b) the at least one acrylate monomer is tripropylene glycol diacrylate, trimethylolpropane triacrylate, propoxylated neopentyl glycol diacrylate, or any combination thereof.

* * * * *